(12) United States Patent
Lin et al.

(10) Patent No.: US 11,270,345 B2
(45) Date of Patent: Mar. 8, 2022

(54) IDENTIFYING AND TARGETING USERS BASED ON ENERGY USAGE AND PROFILE

(71) Applicant: Oracle International Corporation, Redwood Shores, CA (US)

(72) Inventors: Jessica Lin, Virginia Beach, VA (US); Sanem Bengi Kabaca, Falls Church, VA (US); Matt Frades, Takoma Park, MD (US); David Ware, Virginia Beach, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/806,524

(22) Filed: Mar. 2, 2020

(65) Prior Publication Data

US 2021/0272156 A1    Sep. 2, 2021

(51) Int. Cl.
*G06Q 30/02* (2012.01)

(52) U.S. Cl.
CPC ..... *G06Q 30/0255* (2013.01); *G06Q 30/0261* (2013.01)

(58) Field of Classification Search
CPC .............. G06Q 30/0255; G06Q 30/0261
See application file for complete search history.

(56) References Cited

U.S. PATENT DOCUMENTS

| 2010/0289643 | A1* | 11/2010 | Trundle | H04L 12/282 340/545.1 |
| 2014/0201315 | A1* | 7/2014 | Jacob | G08B 25/08 709/217 |
| 2014/0371937 | A1* | 12/2014 | Weaver | F24F 11/62 700/291 |
| 2018/0204293 | A1* | 7/2018 | Bazhinov | H02B 1/24 |

(Continued)

OTHER PUBLICATIONS

Eisenberg, Weatherization Assistance Program Technical Memorandum Background Data and Statistics on Low-Income Energy Use and Burdens, ORNL/TM-2014/133, Oak Ridge National Lab, Oak Ridge, TN, Apr. 2014, available at: https://weatherization.ornl.gov/wp-content/uploads/pdf/2011_2015/ORNLTM2014_133.pdf (accessed Jul. 2, 2020).

(Continued)

*Primary Examiner* — Scott C Anderson
(74) *Attorney, Agent, or Firm* — Potomac Law Group, PLLC

(57) ABSTRACT

Embodiments target users based on energy usage and profile. For example, energy usage data can be received for households monitored using a plurality of meters, where the energy usage data is associated with the households and users. A data set that includes estimated energy usage over geographic areas can be received. The monitored energy usage data and the data set can be combined using a mapping, where the mapping includes location mappings between location information for the households and the geographic areas from the data set. Users with user profiles (Continued)

that meet a targeting criteria can be targeted based on the combined monitored energy usage data and the data set, where the users are targeted based on the location mappings. A messaging campaign that transmits messages to the targeted users can be executed.

18 Claims, 20 Drawing Sheets

(56) References Cited

U.S. PATENT DOCUMENTS

2019/0004098 A1* 1/2019 Wong .................. G01D 4/002
2019/0087762 A1* 3/2019 Ranjan ................. G06Q 50/06

OTHER PUBLICATIONS

Unknown, US EIA, One in three U.S. households faces a challenge in meeting energy needs, Today in Energy, Sep. 2018, available at: https://www.eia.gov/todayinenergy/detail.php?id=37072. (accessed Jul. 2, 2020).

Colton, R.D., Jun. 2011, *Home Energy Affordability in New York: The Affordability Gap* (2008-2010). Prepared for New York State Energy. Research Development Authority (NYSERDA) Albany, New York. Available online at:. http://www.nyserda.ny.gov/-/media/Files/EDPPP/LIFE/Resources/2008-2010-affordability-gap.pdf. (accessed Jul. 2, 2020).

Hastings et al., Feb. 2015, *Driving Miss Participation*, AESP National Conference 2015.

Lin, Sep. 2018, *Affordability and access in focus: Metrics and tools of relative energy vulnerability*, The Electricity Journal 31 (2018) 23-32, available online Sep. 7, 2018, https://doi.org/10.1016/j.tej2018.06.005.

Unknown, Dec. 2019, Final annual report to the Pennsylvania Public Utility Commission, 2018-2019, http://www.puc.state.pa.us/General/publications_reports/pdf/18-19_PUC_Ann_Rpt.pdf (accessed Jul. 2, 2020).

* cited by examiner

↙ 1802

Save more with a heat pump upgrade

Save up to $XX by switching to a heat pump
You can take action to save money and energy while improving the comfort of your home by switching to a heat pump with eversource's help.

Contact our team to learn whether you qualify for our resource, special offers, and financing options.

555-555-555
eversource@eversource.com

US 11,270,345 B2

IDENTIFYING AND TARGETING USERS BASED ON ENERGY USAGE AND PROFILE

FIELD

The embodiments of the present disclosure generally relate to targeting users based on energy usage and profile.

BACKGROUND

Over time, it has proven challenging for utilities to identify certain communities and target specific campaigns to these communities. For example, conventional techniques often fail to target low and moderate income (LMI) communities with effective campaigns, such as those aimed at improving household energy usage or energy efficiency, promoting LMI payment programs, or even general awareness and marketing campaigns. While household energy usage data has been available in some forms, leveraging this data to identify and target communities, such as LMI communities, has had limited success in improving outcomes. Some of these deficiencies relate to the inability to effectively identify both the households and users or customers within the households, such as based on criteria other than, or in addition to, household energy usage data. Techniques for identifying and targeting users and households to improve energy efficiency can generate positive returns for the users themselves as well as the energy infrastructure that powers the households.

SUMMARY

The embodiments of the present disclosure are generally directed to targeting users based on energy usage and profile. For example, energy usage data can be received for households monitored using a plurality of meters, where the energy usage data is associated with the households and users. A data set that includes estimated energy usage over geographic areas can be received. The monitored energy usage data and the data set can be combined using a mapping, where the mapping includes location mappings between location information for the households and the geographic areas from the data set. Users with user profiles that meet a targeting criteria can be targeted based on the combined monitored energy usage data and the data set, where the users are targeted based on the location mappings. A messaging campaign that transmits messages to the targeted users can be executed Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
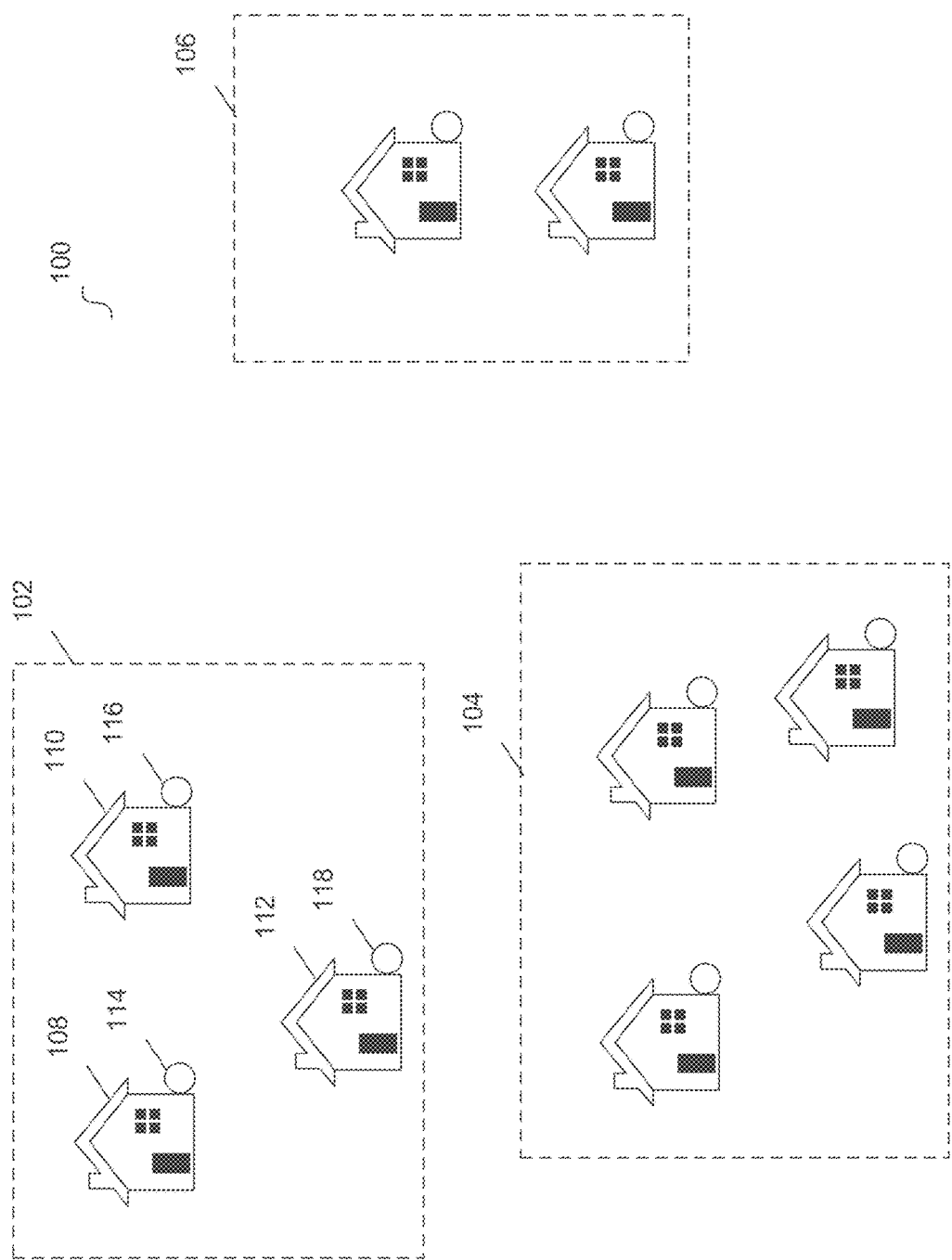
FIG. 1 illustrates a system for targeting users based on energy usage and profile according to an example embodiment.

Embodiments target energy users based on household energy usage and profile. For example, energy usage for households can by monitored, such as by meters at the households. In some instances, the monitored energy usage can be used to target customers. However, many households lack metering infrastructure to capture comprehensive energy usage data. For example, electrical energy usage may be metered, but other forms of energy usage (e.g., gas, other heating types, and the like) may be missing. Accordingly, based on metering infrastructure, the types of energy being used in households, and other factors, the energy usage picture over a geographic region for households can be mixed. Embodiments combine data from disparate sources based on a selective mapping to enable user targeting in the presence of a heterogeneous mix of household energy usage.

For example, household metered energy usage data can be combined with known information about the geographic locations of the households. In some embodiments, a mapping that maps households to a geographic location (e.g., city, county, census tract, and the like) can be used to fill gaps in household metered energy usage. For example, where a household has metered electricity energy usage, the geographic location for the household can be mapped to a dataset that associates heating types (e.g., gas, oil, and the like) to geographic location. This mapping can be used to determine whether a gap exists in the metered energy usage data. Further, the mapping of the household's geographic location can also be used to associate an average heating energy usage for a particular heating type to the household, thus filling a gap in the metered data.

Accordingly, a more complete energy usage picture can be generated that enables targeting of users in the households. In some embodiments, profiles can be generated that include features of both households and users within the households. For example, a profile can include users' household income, heating type for geographic location, owner status of the user within the household (e.g., owner or renter), energy usage, energy usage profile based metric (e.g., energy burden, share of income used for energy usage, ability to pay energy usage costs, and the like), and other factors. In this example, a particular user and household combination can be a target profile. For example, households over a certain age that use a particular type of heating may be prone to inefficient heating, and thus an upgrade may result in more energy efficiency and lower costs. In some embodiments, a profile may be targeted for households that use a certain heating type, households over a certain age, with low income users or users with a calculated energy usage profile based metric that meets a criteria (e.g., energy burden over a threshold, ability to pay index below a threshold), and that have energy usage over a criteria (e.g., high energy user).

These profiles can be targeted due to the value available to the users associated with the profile, and a marketing campaign can be implemented that transmits messages to the users about options for increasing the household energy efficiency. Such a targeted marketing campaign can result in higher resource efficiency (e.g., cost per energy efficiency achieved) since the messages are targeted to users that are likely to incorporate changes and benefit.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for targeting users based on energy usage and profile according to an example embodiment. System 100 includes geographic regions 102, 104, and 106, households 108, 110, and 112, and meters 114, 116, and 118. Geographic regions 102, 104, and 106 can be any suitable geographic regions that physically contain households, such as a city, county, census tract, and the like. Households 108, 110, and 112 can be located in geographic region 102. Geographic regions 104 and 106 can similarly have households located in these regions. In some embodiments, households 108, 110, and 112 (and the households located in geographic regions 104 and 106) are supplied power by an electric power grid, a local power source (e.g., solar panels), a combination of these, or any other suitable source. In some embodiments, one or more entities, such as utility entities, can supply power to these households. For example, the utility entity can implement a power grid, power stations, local metering equipment, and any other suitable elements to supply power to the households.

In some embodiments, meters 114, 116, and 118 can be used to monitor the energy usage (e.g., electricity usage) at households 108, 110, and 112. For example, any of meters 114, 116, and 118 can be a smart meter, an advanced metering infrastructure ("AMI") meter, an automatic meter reading ("AMR") meter, a simple energy usage meter, and the like. In some embodiments, meters 114, 116, and 118 can transmit information about the energy usage at households 108, 110, and 112 to a central power system, a supplier, any element of a utility entity, an analytics service provider, a third party, or any other suitable entity or combinations of entities. For example, meters 114, 116, and 118 can implement two-way communication with an entity in order to communicate the energy usage. In some embodiments, meters 114, 116, and 118 may implement one-way communication with an entity, where meter readings are transmitted to the entity.

In some embodiments, meters 114, 116, and 118 can communicate over wired communication links and/or wireless communication links, and can leverage wireless communication protocols (e.g., cellular technology), Wi-Fi, wireless ad hoc networks over Wi-Fi, wireless mesh networks, low power long range wireless ("LoRa"), ZigBee, Wi-SUN, wireless local area networks, wired local area networks, and the like. For example, one or more devices (e.g., air conditioner, heater, refrigerator, laundry machine, dish washer, electric vehicle, and the like) can use energy at household 108, and meter 114 can monitor the energy usage for the household and report the corresponding data.

The following description includes recitations of a criterion or criteria. These terms are used interchangeably throughout the disclosure, the scope of criteria is intended to include the scope of criterion, and the scope of criterion is intended to include criteria.

Figure 2:
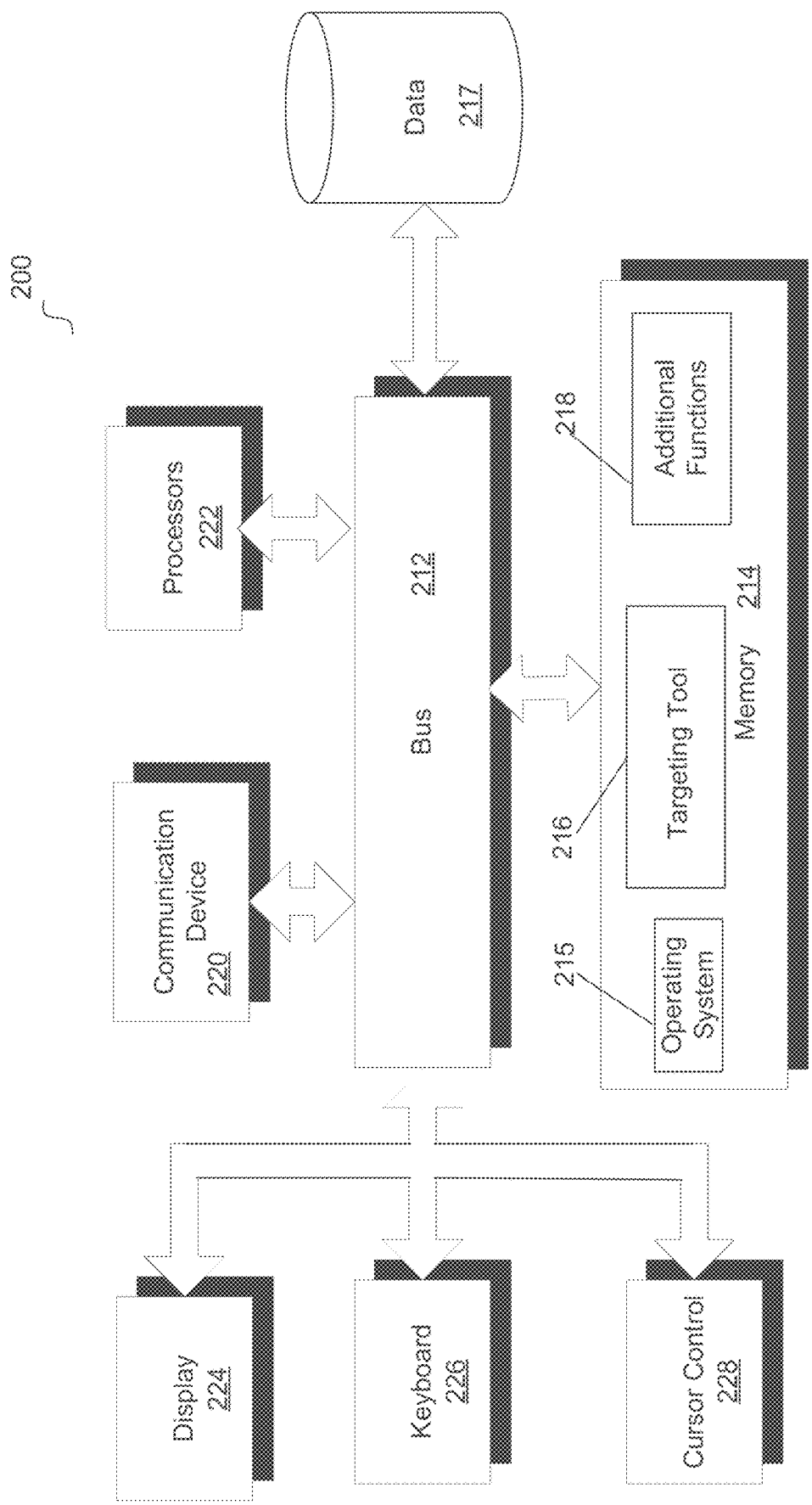
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, targeting tool 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a targeting tool 216 that implements the user targeting functionality disclosed herein, as well as other applications modules 218. Operating system 215 provides operating system functionality for system 200. In some instances, targeting tool 216 may be implemented as an in-memory configuration. In some implementations, when system 200 executes the functionality of targeting tool 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Utilities Customer Cloud Service, Oracle® Cloud Infrastructure, Oracle® Cloud Platform, Oracle® Cloud Applications, for example. Targeting tool 216, other applications module 218, and any other suitable component of system 200 can include various modules of Oracle® Data Science Cloud Service, Oracle® Data Integration Service, or other suitable Oracle® products or services.

A database 217 is coupled to bus 212 to provide centralized storage for modules 216 and 218 and to store, for example, data received by computer vision tool 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
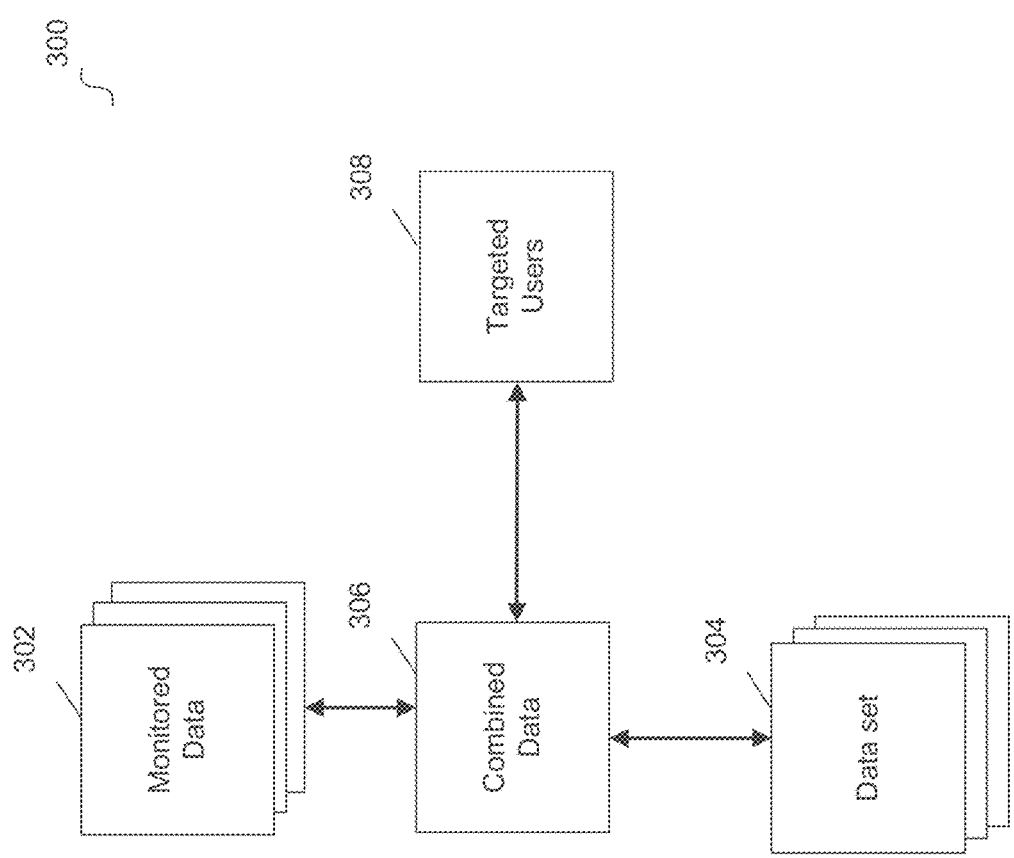
FIG. 3 illustrates a diagram for combining data to target users based on energy usage and profile according to an example embodiment.

FIG. 3 illustrates a diagram for combining data to target users based on energy usage and profile according to an example embodiment. System 300 includes monitored data 302, data set 304, combined data 306, and targeted users 308. In some embodiments, monitored data 302 can include energy usage data monitored for households. For example, an entity such as a utility can monitor energy usage for households (e.g., within the utility's coverage area). In some embodiments, data set 304 can include estimated data for energy usage within geographic locations. For example, within a given city, county, or census tract, estimated average energy usage can be determined for the average household, for example by a public entity (e.g., Federal, state, or municipal government), or any other suitable entity. In some embodiments, estimated average energy usage for households can be segmented by income.

In some embodiments, monitored data 302 and data set 304 can be combined to generate combined data 306. For example, combined data 306 can be a data model that includes a mapping between monitored data 302 and data set 304. In some embodiments, the mapping can include a location mapping that maps the physical locations of households that include monitored energy usage data (e.g., within monitored data 302) to the geographic locations (e.g., city, state, or census tract locations within data set 304). For example, the location mapping can be used to generate combined data 306 as the combined data model enables data associated between the household monitored energy usage data from monitored data 302 and the estimated energy usage information in data set 304.

In some embodiments, targeted users 308 can be generated based on combined data 306. For example, monitored data 302 may include gaps of information for households, for example due to limited metering infrastructure or other factors. Data set 304 can be used to fill these data gaps. In some embodiments, the associations generated between monitored data 302 and data set 304 based on the mapping between the data models fills gaps in the monitored data for households and enables targeting of users in the households. For example, users (e.g., individuals) within the households can be targeted for a marketing campaign to increase energy efficiency and lower energy costs at the households.

Figure 4:
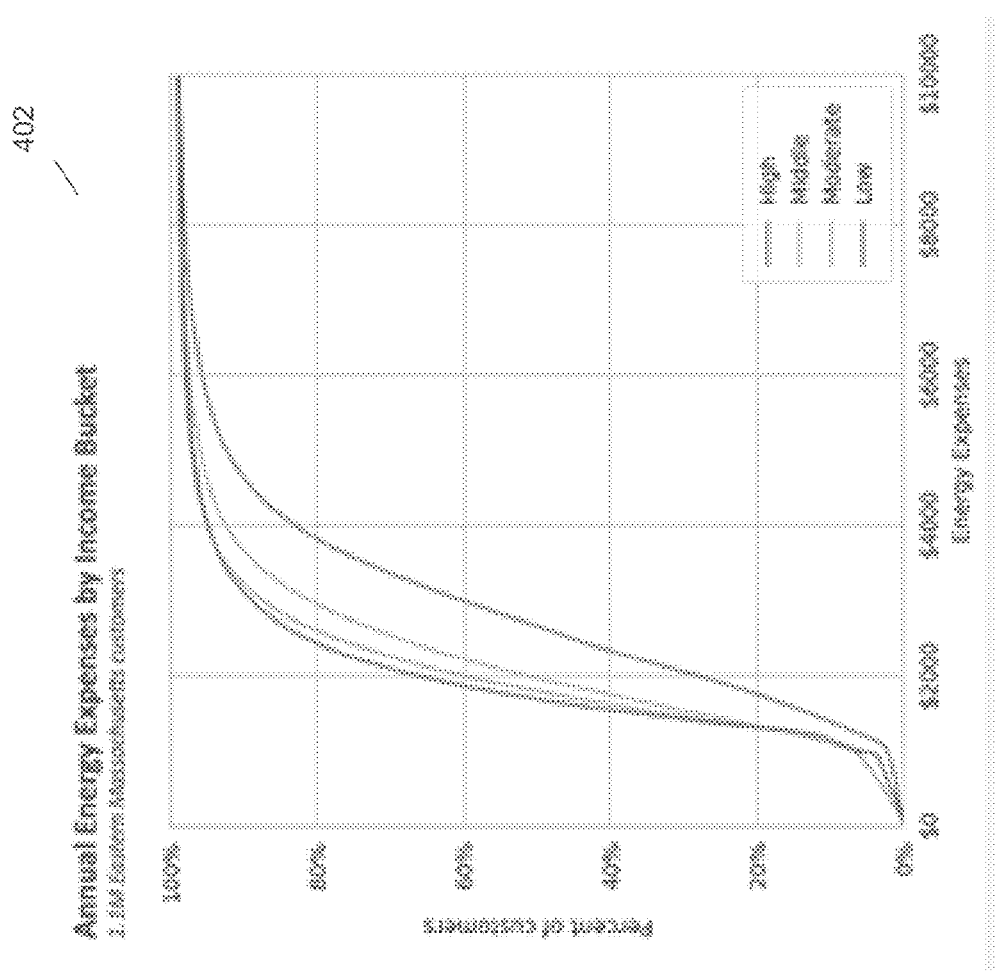
FIG. 4 illustrates a sample graph of energy expenses by income according to an example embodiment.

In many places, such as the United States, low-income households suffer a disproportionate energy burden, defined as the percentage of gross household income spent on energy costs. For example, it is estimated that over 70 million low and moderate income (LMI) Americans struggle to pay their electricity bills each year. Reports indicate that low income households typically spend 16.3% of their total annual income versus 3.5% for other households. See Eisenberg, Joel, Weatherization Assistance Program Technical Memorandum Background Data and Statistics On Low-Income Energy Use and Burdens, ORNL/TM-2014/133, Oak Ridge National Lab, Oak Ridge, Tenn., April, 2014, available at: https://weatherization.ornl.gov/wp-content/uploads/pdf/2011_2015/ORNLTM2014_133.pdf. For many of these households, the lack of available budget after energy costs leads to other issues, such as difficulty paying for groceries, medical bills, and other necessities. There is also a misconception that low income translates to low energy usage. However, an analysis of some customer data reveals that low income users' usage is in line with moderate or high income users. FIG. 4 illustrate a sample graph of energy expenses by income according to an example embodiment. Graph 402 shows the relative energy expenses by different income buckets, and displays how low income households are in line with moderate or high income users. This may be because they live in less efficient households and have less money to make energy saving home improvements.

According to the United States Energy Information Administration (US EIA), 1 in 3 Americans faced energy insecurity in 2015. See US EIA, One in three U.S. households faces a challenge in meeting energy needs, Today in Energy, September 2018, available at: https://www.eia.gov/todayinenergy/detail.php?id=37072. This poses problems of its own, such as increased health challenges due to lack of heat. In addition, utilities face risks by not targeting and engaging these customers, including:

Arrearages from customers who cannot pay their bills—low and moderate income customers (61.4% of the US population was considered low or moderate income by the AMI scale in 2016)

Not meeting regulatory mandates for low income customer and/or energy efficiency targets Decreased customer satisfaction from customers who do not feel engaged In conventional implementations, utilities have experienced challenges in targeting low income users. Some community-based efforts attempt to target these users, however these techniques are laborious, cost-intensive, and often do not capture the full picture of low and moderate income users (LMI). Techniques that target based on income verification are also prone to miss large swaths of the population.

Embodiments utilize a first-of-its-kind analytical approach that can, for example, characterize communities in need and target individuals or households that can most benefit from energy cost alleviation. While many conventional approaches have relied solely on energy burden as a metric to characterize need for targeting, embodiments employ a data-driven methodology that leverages individual energy consumption, available customer demographic data, third party data and innovative, open source data sets. In some embodiments, the resultant curated portfolio of metrics provides more than a characterization of burden to illuminate specific characteristics of target communities.

Embodiments can be used to create nuanced marketing campaigns that are specific to the socio-economic needs of a particular area, user, and/or household. For example, the conventionally used 6% energy burden obscures the fact that 1 in 4 low income renters pay over 70% on housing costs and thus may not have funds available for energy no matter how low the burden threshold. See Desmond, Matthew, 2016. Evicted: Poverty and Profit in the American City, New York. pp. 1991-2013 From American Housing Survey (AHS) data. Results from embodiments also indicate that the combined portfolio of metrics uncovers users or households that slip through the cracks when income or neighborhood alone are used to target.

Figure 5:
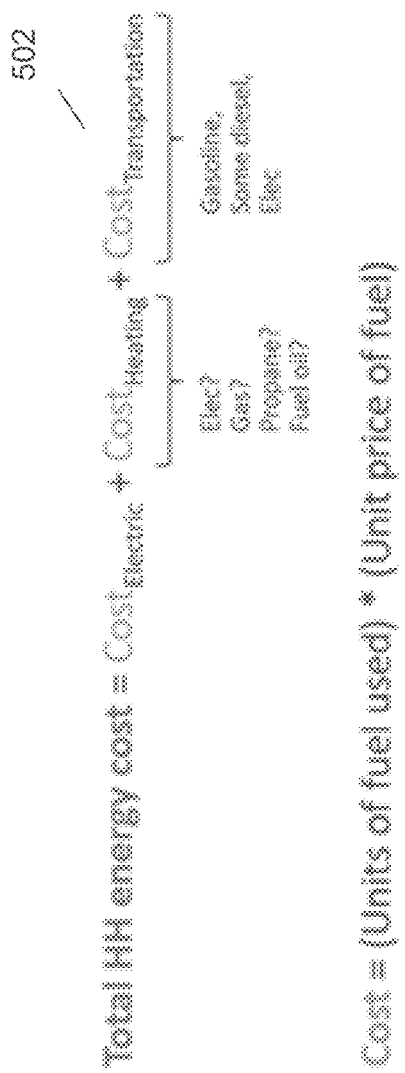
FIG. 5 illustrates a sample equation for total household energy cost according to an example embodiment.
Figure 6:
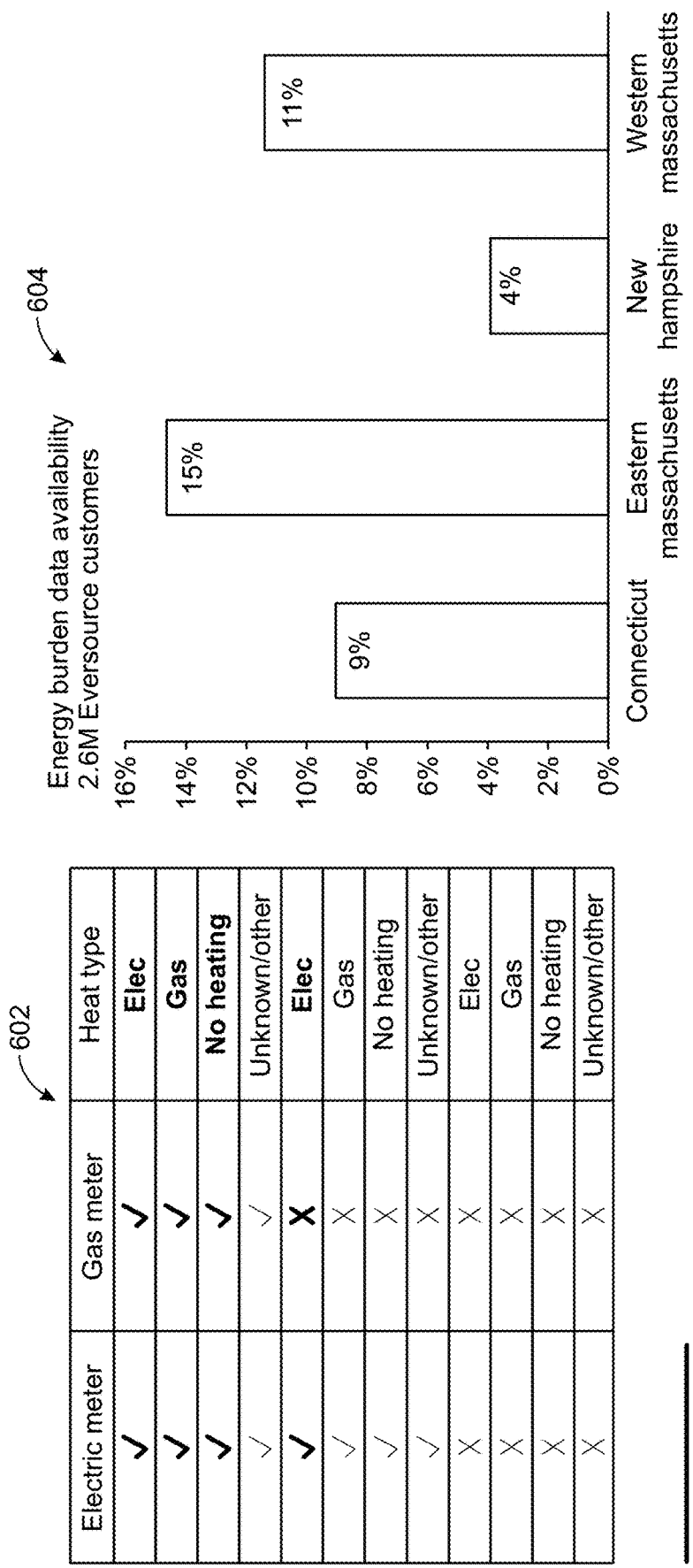
FIG. 6 illustrates a sample graph of energy burden according to an example embodiment.

An example analysis for descriptive purposes considers energy consumption in three states Connecticut, Massachusetts and New Hampshire, however any other set of data can be used. FIG. 5 illustrate a sample equation for total household energy cost according to an example embodiment. As illustrated in equation 502, energy burden can be defined as total household (HH) energy cost divided by HH income. An initial energy data set included electric usage and some gas information for households, however information available on heating fuels like fuel oil or propane (which disproportionately impact HH energy costs in the Northeast region of the US) was not available in this initial data set. FIG. 6 illustrates a sample energy chart 602 and a sample graph 604 of available energy burden data according to an example embodiment.

Figure 7:
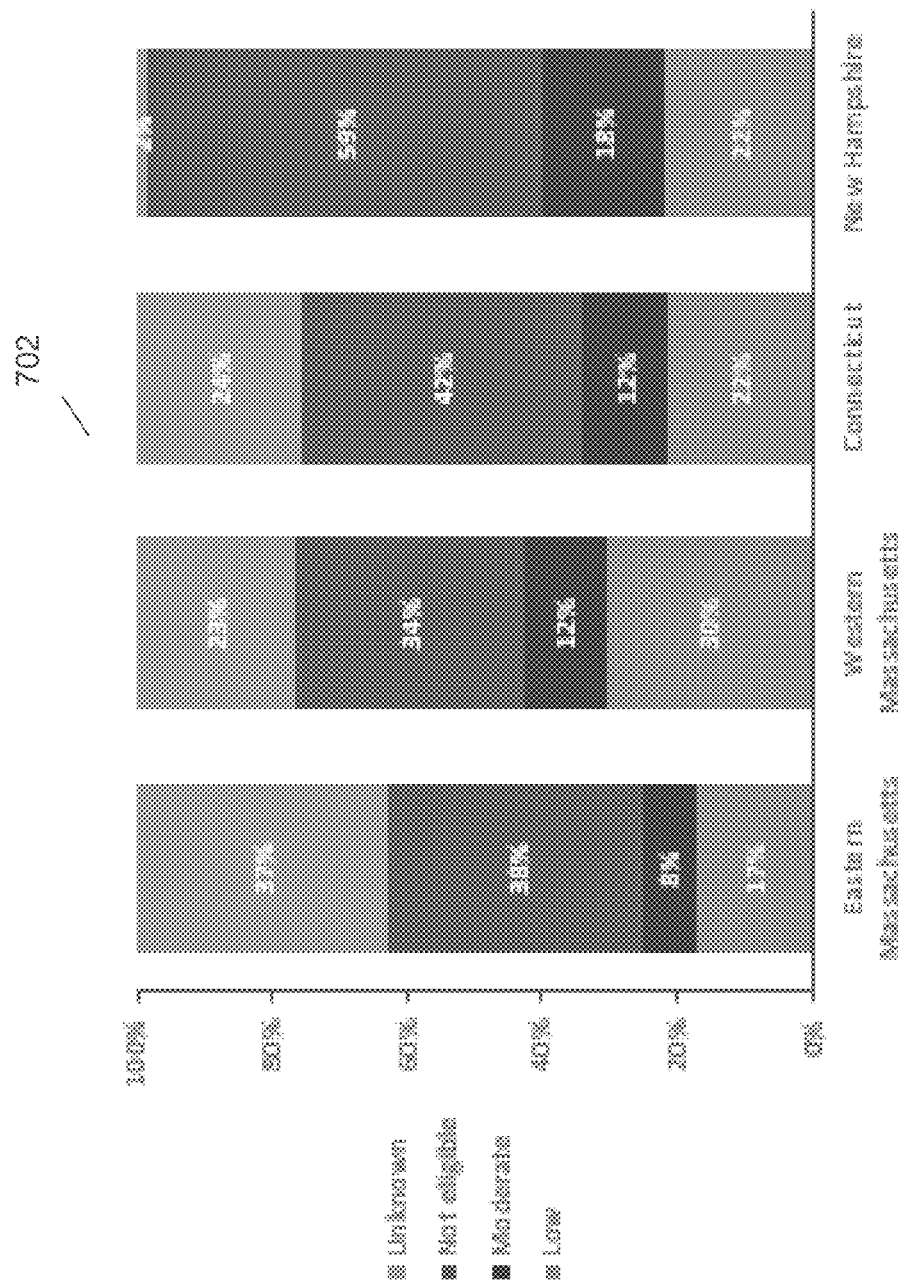
FIG. 7 illustrates a sample bar graph of income data available by geographic region according to an example embodiment.
Figure 8:
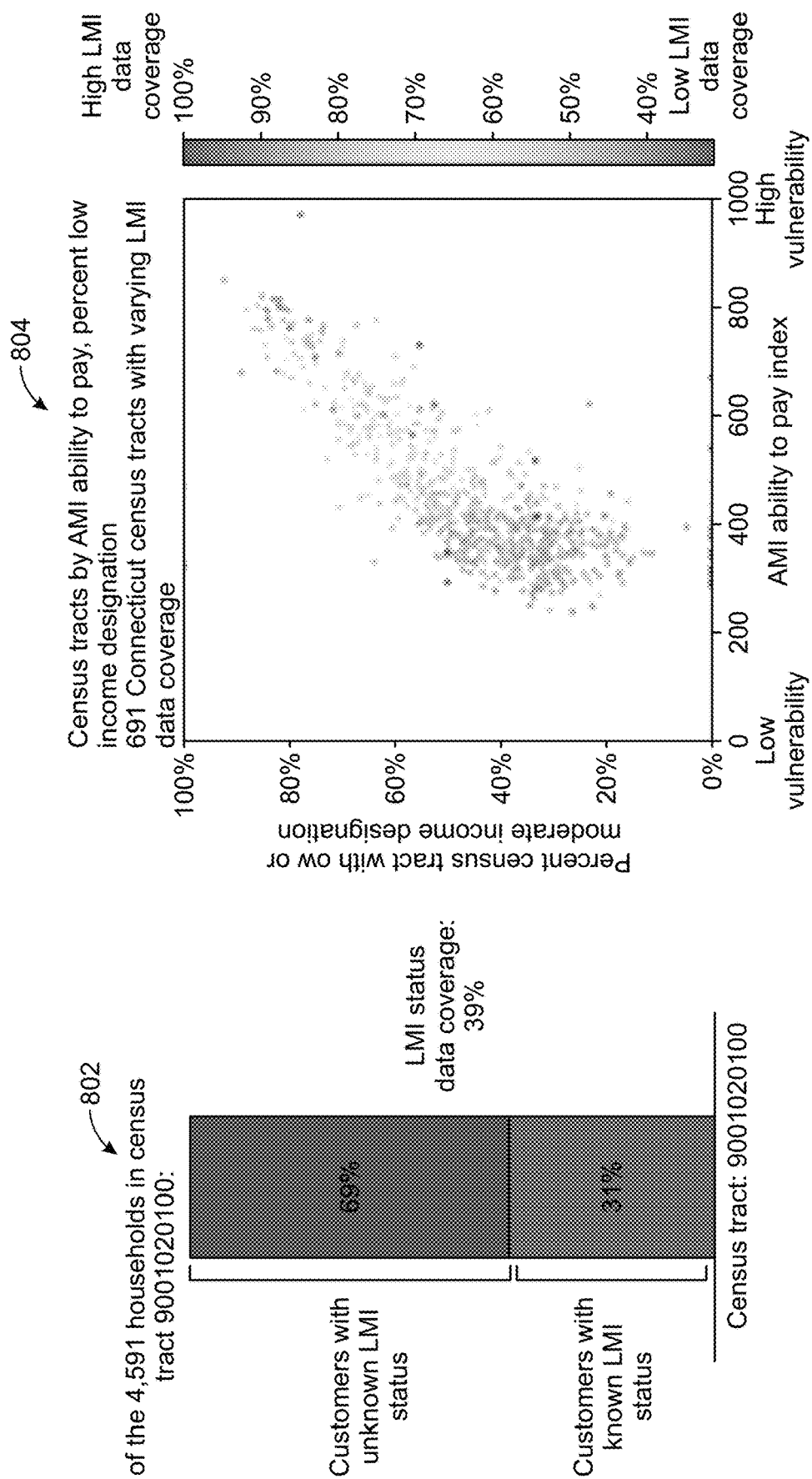
FIG. 8 illustrates sample graphs of income data availability for a geographic region according to an example embodiment.

An initial income data set was then used to augment the initial energy data set. However, the household income data was incomplete and was particularly sparse for low income households. FIG. 7 illustrates a sample bar graph 702 of available income data by geographic region according to an example embodiment. FIG. 8 illustrates sample graphs 802 and 804 of income data availability for a geographic region according to an example embodiment. Embodiments implement a portfolio approach to digital targeting and characterization using initial data sets including customer data and supplemental data sets including open sourced data sets, described herein, to supplement the analysis and to mitigate data gaps in the initial data sets.

Embodiments improve upon the limitations in the traditional approach to target customers in a number of ways. First, demographic communities are located and characterized in a utility's service territory through a combination of utility data and open sourced data sets. Example datasets used serve three high-level purposes:

Digital Targeting of Communities

| Data Type | Definition | Source |
|---|---|---|
| Primary electric and gas usage | Residential energy consumption data | Utility data |
| County-level energy burden | proportion of a customer's income that goes towards energy expenses | Low-income Energy Affordability Data (LEAD) Tool https://openei.org/doe-opendata/datasnet/celica-data. |
| Ability to Pay Index | a census-tract level metric that serves as a proxy for available budget by subtracting housing costs from income | Lin, Jessica, Affordability and access in focus: Metrics and tools of relative energy vulnerability, The Electricity Journal, Volume 31, Issue 6, July 2018, Pages 23-32, available at: https://doi.org/10.1016/j.tej.2018.06.005 |

Referring back to FIG. 3, monitored data 302 can be energy usage data for households monitored by an entity, such as a utility, as addressed above. For example, a data model for monitored data 302 can include:

a. User data model:
  i. Unique customer_id representing a household
    1. Ex. John Doe is customer_id=123
  ii. Unique site_id representing the property a customer_id occupies
    1. John Doe (customer_id 123) lives at site_id 456
  iii. Unique service_point_ids representing individual meters at a site_id
    1. John Doe (customer_id 123 at site_id 456) has two meters, an electric meter (service_point_id 789) and a gas meter (service_point_id 100)
  iv. Latitude and longitude points for each site_id
    1. Site_id 456 is located at (35.793578, −78.8652564)
  v. Customer-level demographic data (for example, acquired from third party external to utility):
    1. Income: 15 buckets, each provided as a range (i.e., $20,000-$40,000)
    2. Owner/renter status vi. Customer-level site parcel data (for example, acquired from third party external to utility) assigned to each site_id:
   1. Home Heat Type: electric, natural gas, no heat, other, or NULL (unknown)
vii. Monthly usage charges for each service_point_id for a time period (here, 2018-01-01 to 2018-12-31)
viii. Customer-level demographic and site parcel data (for example, acquired from third party external to utility):
   1. Income: 15 buckets, each provided as a range (i.e., $20,000-$40,000)
   2. Owner/renter status
   3. Home Heat Type: electric, natural gas, no heat, other, or NULL (unknown)

In some embodiments, data set 304 can include publicly available data or open source data. For example, a data model for data set 304 can include:

a. County shapefiles: A vector file outlining all U.S. counties
b. Census-tract shapefiles: A vector file outlining all U.S. census tracts c. Fuel usage charges: County-level annual fuel charges for electric, natural gas, and fuel oil, segmented by income level and owner/renter status Average usage charges at each income level where customer-level owner/renter status is unknown (37% of customers)
   i.e., a home owner's annual electric charges in census tract XYZ:
$1,000
d. AMI Ability to Pay Index: Census-tract level calculations of the Ability to Pay Index, an energy affordability index that serves as a proxy for a consumer's available household budget
   Census-tract level income buckets based on Index
e. Median Area Income: census-tract level income estimate
f. Dominant heating fuel type: the county-level dominant heating fuel type (electricity, natural gas, distillate fuel oil, wood, propane)
g. Locales and locale size/proximity: A tabular dataset that assigns each census tract to one of four locales (urban, suburban, town, rural) and one of three sizes (large, midsize, small for urban and suburban locales) or one of three proximities (fringe, distant, remote for town and rural locales)

Figure 9:
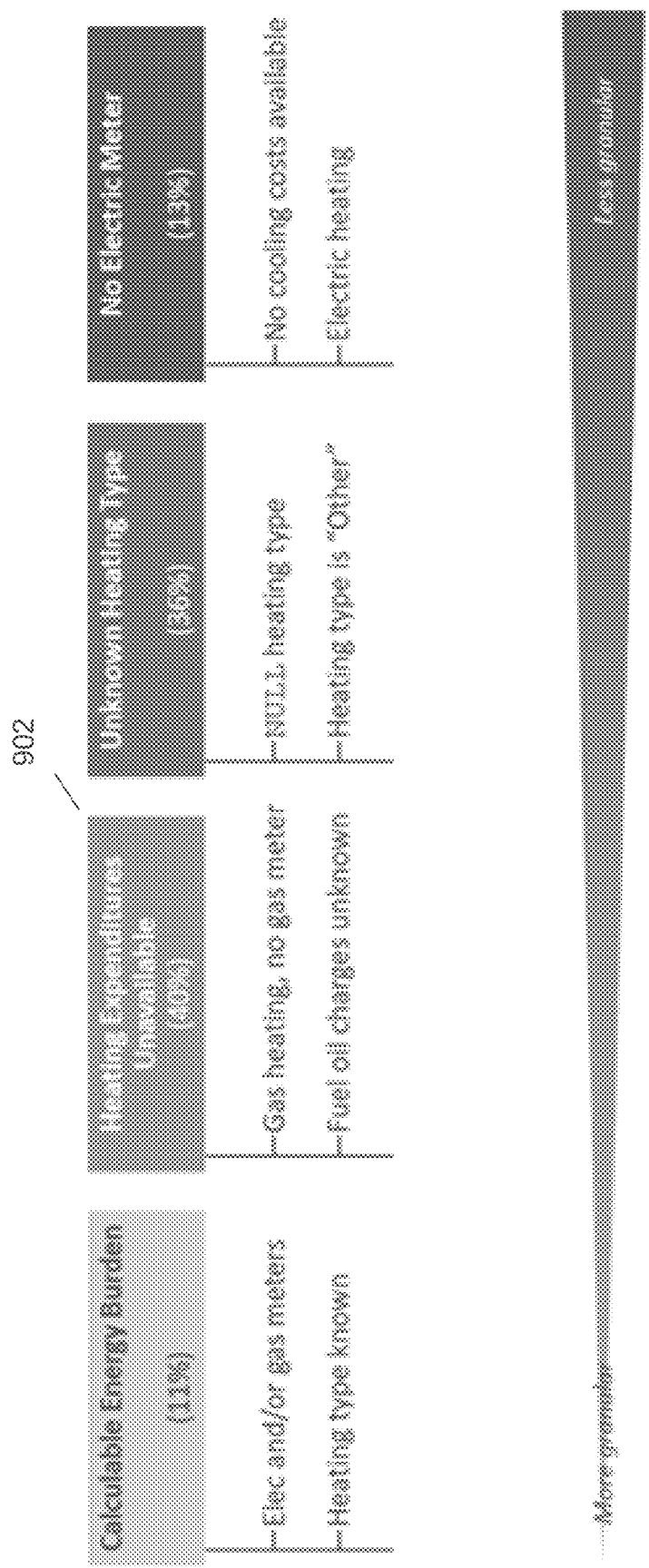
FIG. 9 illustrates a visualization of energy data availability according to an example embodiment.

In some embodiments, gaps in monitored data 302 are filled based on best available data in data set 304. For example, a mapping between data set 304 and monitored data 302 can be used to associate the data models. The mapping can be used to generate combined data 306, for example using:

1. Spatial mapping: assign each site_id to a census tract and county
   a. Use the latitude and longitude for each site_id to determine where in the shape file each site_id lies
2. Combined data
   a. Create a tabular file where each row contains a site_id with the assigned census tract and county
   b. Map all monitored data 302 and data set 304 to each site_id row
   c. Map all census tract- and county-level data set 304 data to each customer based on their assigned census tract and county In some embodiments, the gaps in monitored data 302 can be filled based on best available estimated data in data set 304 that is available for the gap based on the mapping. FIG. 9 illustrates a visualization of energy data availability according to an example embodiment. Visualization 902 demonstrates the heterogeneous energy data available for different households. In some embodiments, the data gaps can be filled using the best-available data to calculate household-level energy burden based on:

| Data | Definition | Source |
| --- | --- | --- |
| Gas or electric expenditures | for single-fuel meter customers at the county-level, segmented by income level and owner/renter status | Low-income Energy Affordability Data (LEAD) Tool https://openei.org/doe-opendata/ datasnet/celica-data. |
| Predominant fuel type | For customers with unknown heating types | Derived from the 2016 EIA 861 |
| Median income levels | At the census tract for customers with unknown income | American Community Survey |

In some embodiments, the energy cost, income, and energy burden can be calculated using a series of predefined rules that use best available data based on combined data 306. For example:

a. Calculate energy costs:
   ix. For customers with both electric and gas meters and electric, natural gas, or no heating (5% of customers)
      1. Aggregate Client usage charges from both electric and gas meters
   x. For customers with an electric meter, no gas meter and either electric heating or no heating (7% of customers)
      1. Aggregate Client usage charges from electric meter
   xi. For customers with an electric meter, no gas meter and natural gas heating (43% of customers):
      1. Aggregate Client electric usage charges with DOE natural gas charges segmented by income bucket and owner/renter status (or averaged natural gas charges where owner/renter status is unknown)
   xii. For customers with electric meter and NULL or "Other" heating types (32% of customers)
      1. Assign heat type based on DOE county-level dominant fuel type
      2. Aggregate Client electric usage charges with either DOE natural gas charges or DOE fuel oil charges (depending on county-level dominant fuel type)
   xiii. For customers with a gas meter, no electric meter (13% of customers)
      1. Aggregate Client natural gas usage charges with DOE electric charges
b. Calculate income
   xiv. Use midpoint of customer-level income buckets where known
   xv. For customers with unknown income (27% of customers), use DOE census-tract level median area income
c. Calculate customer-level energy burden In some embodiments, user profiles that include information about households and users can be used to implement targeted marketing campaigns to users. The profiles can include available energy usage data for the household (including available energy usage of different types, such as electric and gas), available income level, available energy burden, available energy cost and income metric (e.g., ability to pay), available heating type, available age of household, available socio-economic data (e.g., income, and the like), and other suitable information. Embodiments include varying amounts of this information, and thus some user profiles may be incomplete, and best available information is stored and used for targeting purposes. In some embodiments, when available, the profiles for households and users can also include:

Geography

| Data | Definition | Source |
|---|---|---|
| Locale | Urban, suburban, rural designation | National Center for Education Statistics' (NCES), Education Demographic and Geographic Estimates Program (EDGE) |

Household Characteristic:

| Data | Definition | Source |
|---|---|---|
| Vintage | Home age | American Community Survey |
| Dwelling types | Ex. Single or multi family | American Community Survey |

Customer Demographics:

| Data | Definition | Source |
|---|---|---|
| Tenure | Owner/renter status | American Community Survey |
| Education | Education level | Third party source |
| Native language | First language spoken at home | Third party source |

In some embodiments, the joint or combined data set (e.g., combined data 306 of FIG. 3), which represent the user profiles, can be stored in a data store such that the data set can be queried to target users/households (e.g., for a marketing campaign). For example, the combined data set can be stored in a relational database that is queried using structured query language (SQL) statements. The combined data set can be stored with the use of spatial joins. A Hadoop cluster can also be implemented, where disparate data sets that were not joined would conventionally rely on inefficient extraction, transformation, and load (ETL) jobs to associate attributes across data sets. Embodiments implement a combined data set (e.g., using a mapping between data sets) to improve performance, such as embodiments that implement a Hadoop cluster for storage/retrieval.

For descriptive purposes, two additional data sources are considered, for example from a utility, in order to understand the value of layering additional data sources that both increase certainty in targeted customers as well as identify customers that may have previously been missed:
 a. The utility's current targeting methodology that classifies customers as eligible or ineligible for LMI programs (based on data purchased from a third party)
 b. A list of income-verified customers that qualify for LMI programs Embodiments include use-case driven functionality for using the layered datasets and a data extract of household-level calculations and profile segmentation characteristics. In some examples, these metrics can be displayed in suitable visualization software, such as Oracle® Utilities Opower's Data Visualization tool, Data Exploration, and any other suitable visualization tool.

When considering a conventional implementation that uses estimates from a utility, Income Eligibility estimates line up as expected with the open source data set Ability to Pay index. However, a high number of users located in census tracts with low Ability to Pay lack third party demographic data, and thus income eligibility qualification cannot be well estimated. Absent the combination of data sets in embodiments, the estimates would miss many customers who may potentially qualify for low income programs. In other words, the conventional implementation would fail to target many users that are likely to benefit from a marketing campaign related to increasing energy efficiency specific to their household, the users in their household, and/or their community.

Figure 10:
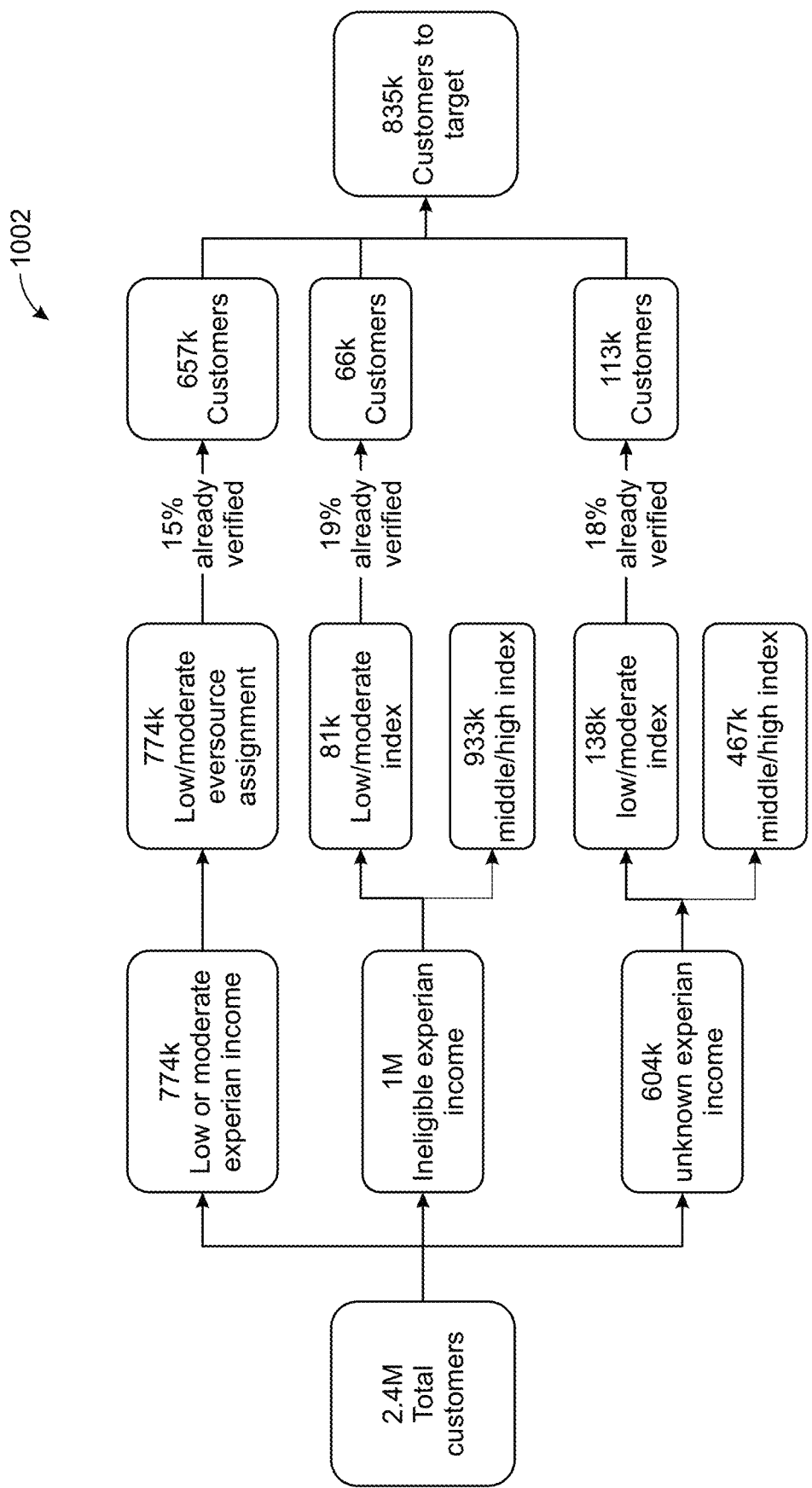
FIG. 10 illustrates a sample visualization of targeted customers according to an example embodiment.

Conventional third-party Income Eligibility also did not line up with those who have qualified, but it provides an additional 774 thousand users to target for outreach. Combining the Ability to Pay index yields an additional 219 thousand customers, producing a total of 835 thousand users who may qualify for Low or Moderate Income programs. FIG. 10 illustrates a sample visualization 1002 of targeted users according to an example embodiment.

Figure 11:
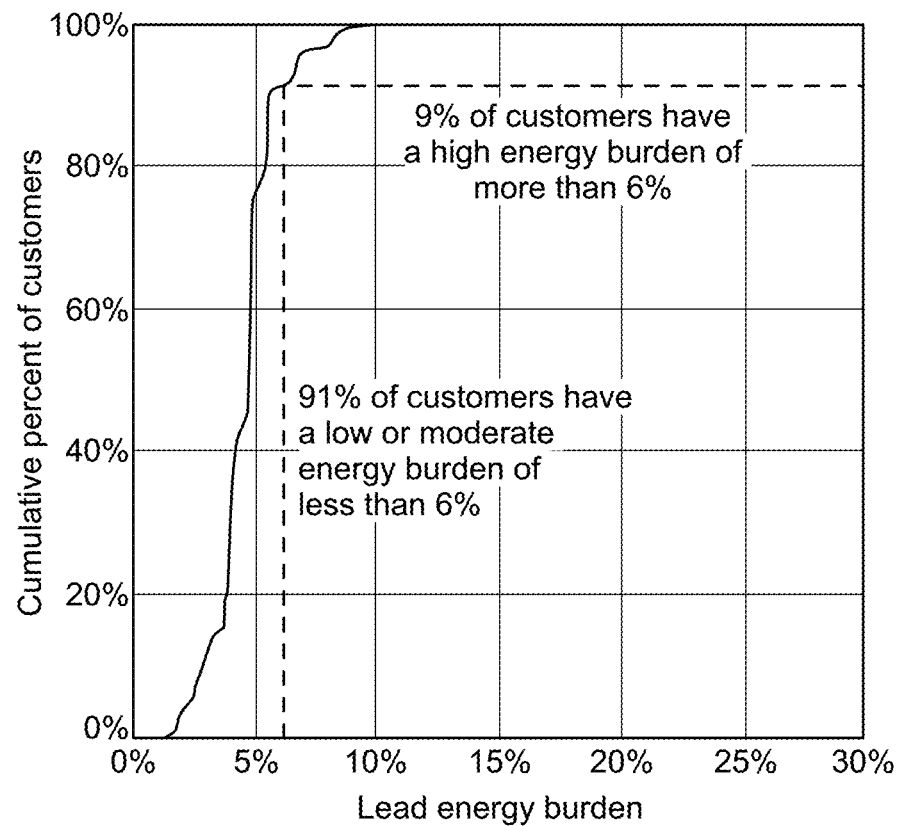
FIG. 11 illustrates a sample graph of household energy level burden according to an example embodiment.
Figure 12:
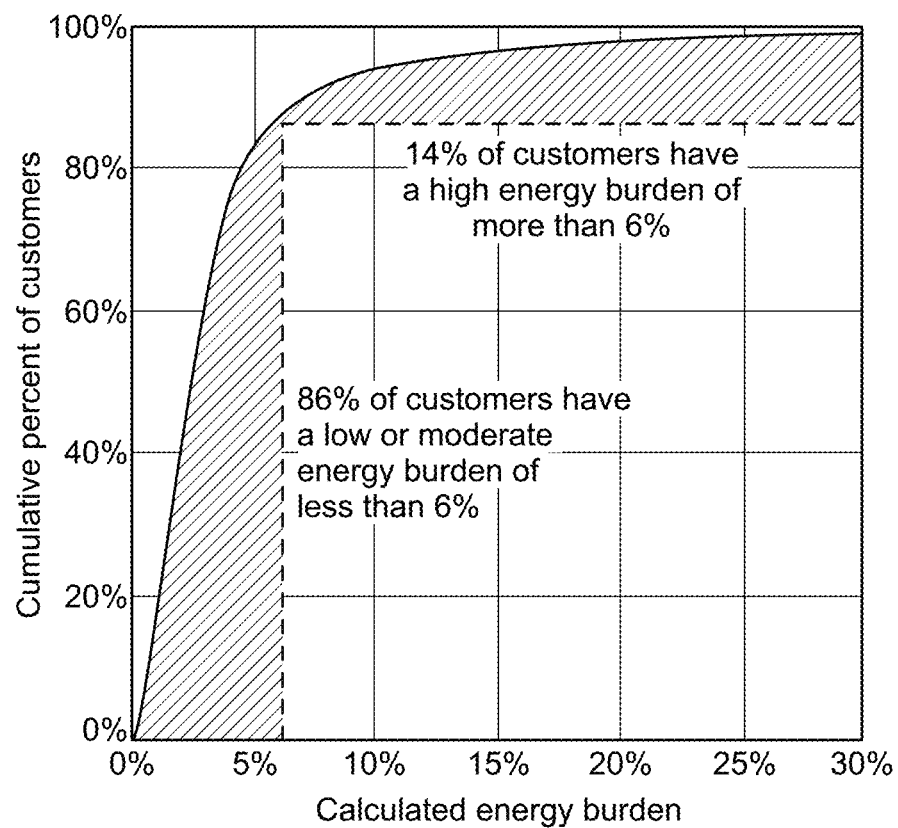
FIG. 12 illustrates another sample graph of household energy level burden according to an example embodiment.
Figure 13:
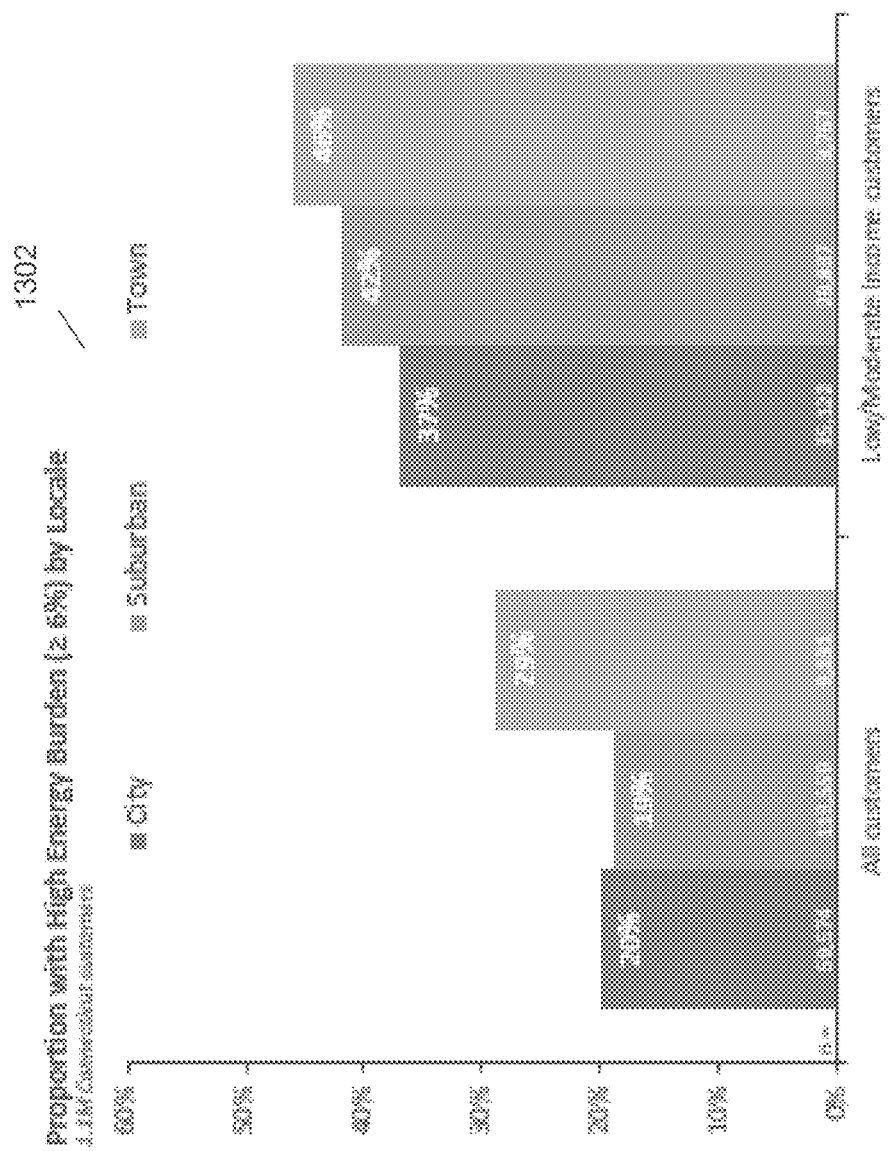
FIG. 13 illustrates a sample bar graph of household energy level burden according to an example embodiment.

Embodiments calculate energy burden through the combined sources. Even though electric and heating expenditures were available for only 11% of users in the initial data, the combined data set enables estimation of energy burden for the remainder of users (e.g., in the utilities service territory). The results produce estimates with improved accuracy compared to conventional approaches. For example, the resultant calculations illustrate the gaps in the conventional data. Open source data estimates that 9% of the users in Massachusetts had a high energy burden (>6%), however embodiments calculated estimates that 15% of the Eastern Massachusetts users had a high energy burden. FIGS. 11 and 12 illustrate sample graphs 1102 and 1202 of household energy level burden according to an example embodiment. Graphs 1102 and 1202 illustrate the improvement in estimate achieved by the combined data leveraged by embodiments.

While Energy Burden is generally higher for lower income users, there are still higher income users experiencing a high energy burden. For example, embodiments calculated that 10% of High and Middle Income users had a high energy burden and 29% of moderate income users had a high energy burden. In addition, it was calculated that 49% of low income users had a high energy burden.

Figure 14:
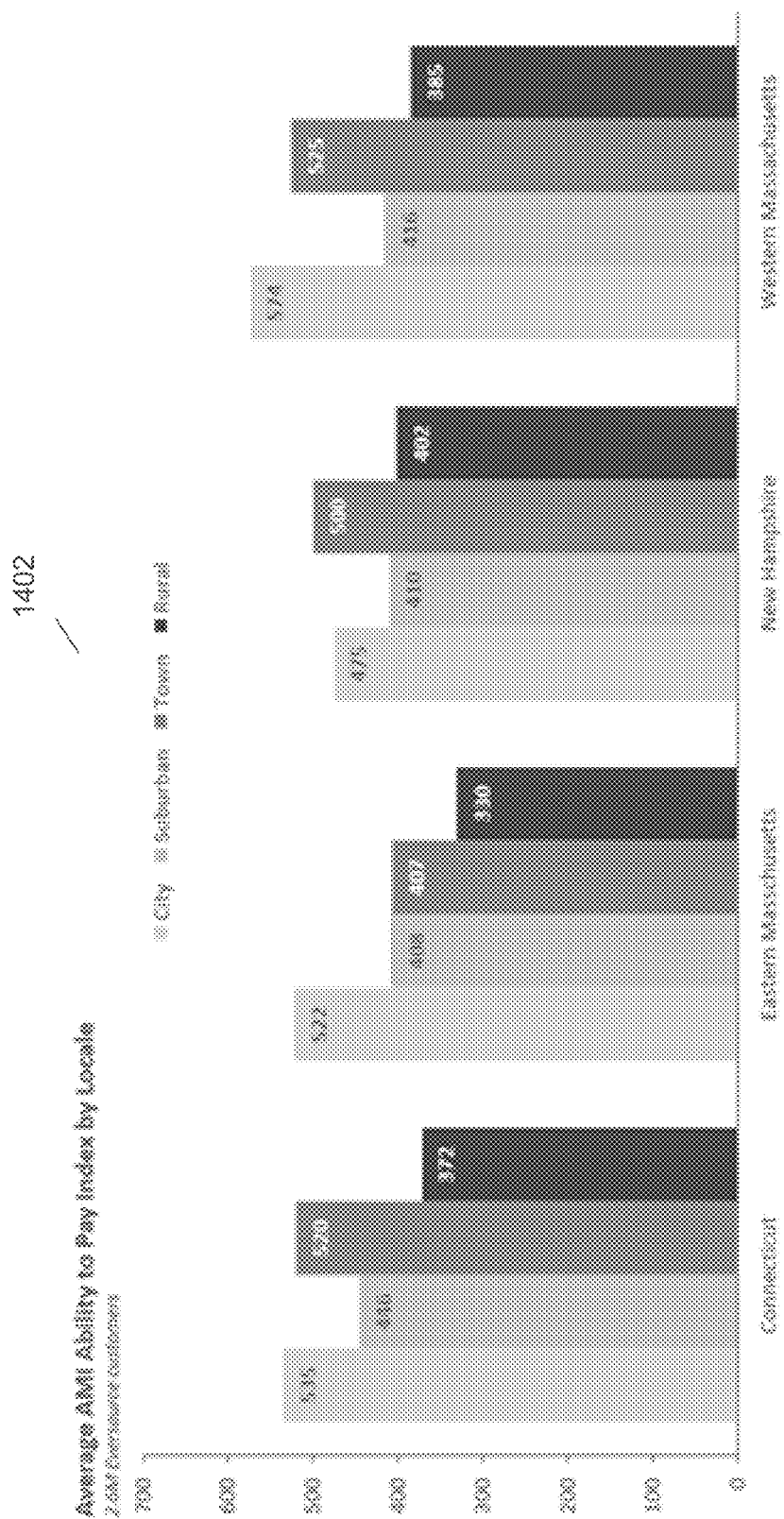
FIG. 14 illustrates a sample bar graph of an income metric based on locale according to an example embodiment.
Figure 15:
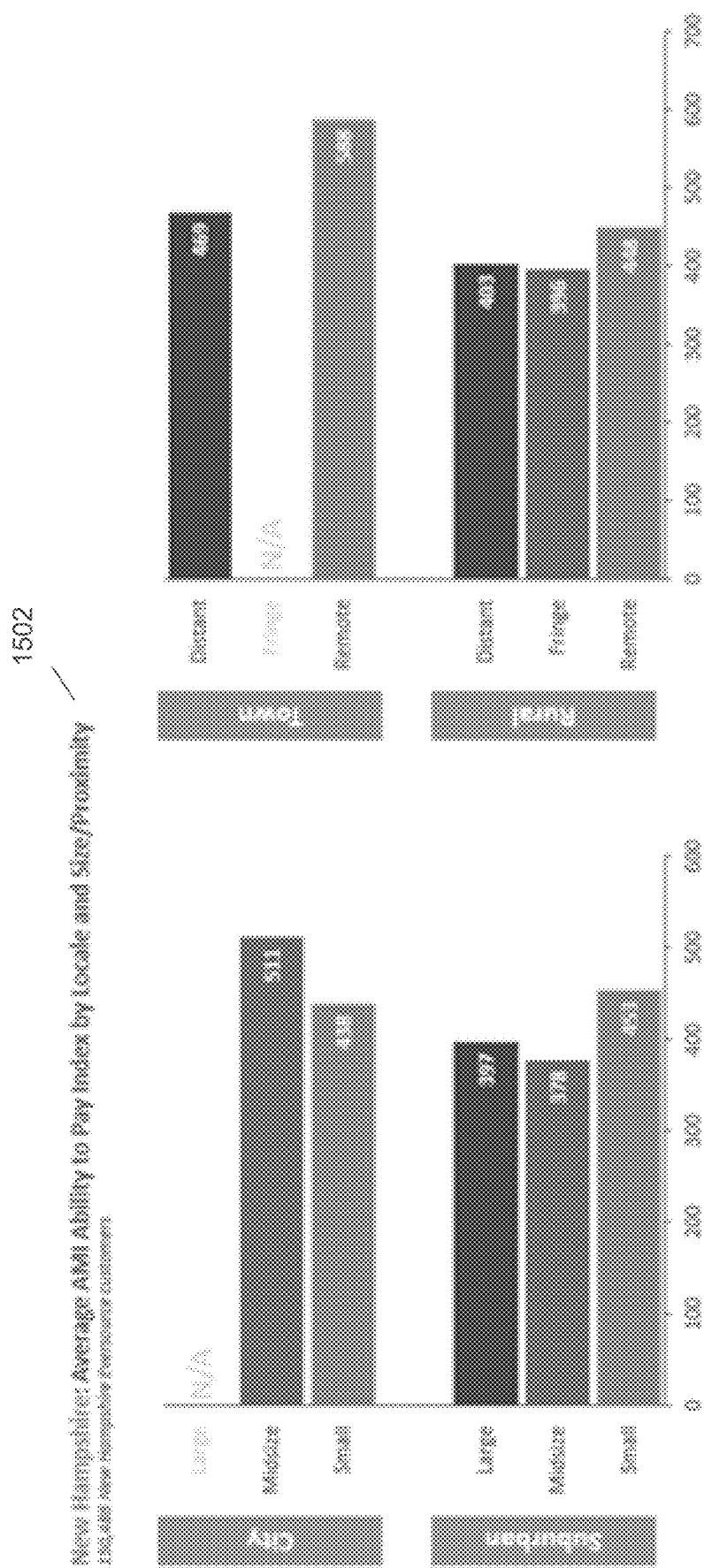
FIG. 15 illustrates a sample bar graph of an income metric based on locale and size according to an example embodiment.
Figure 16:
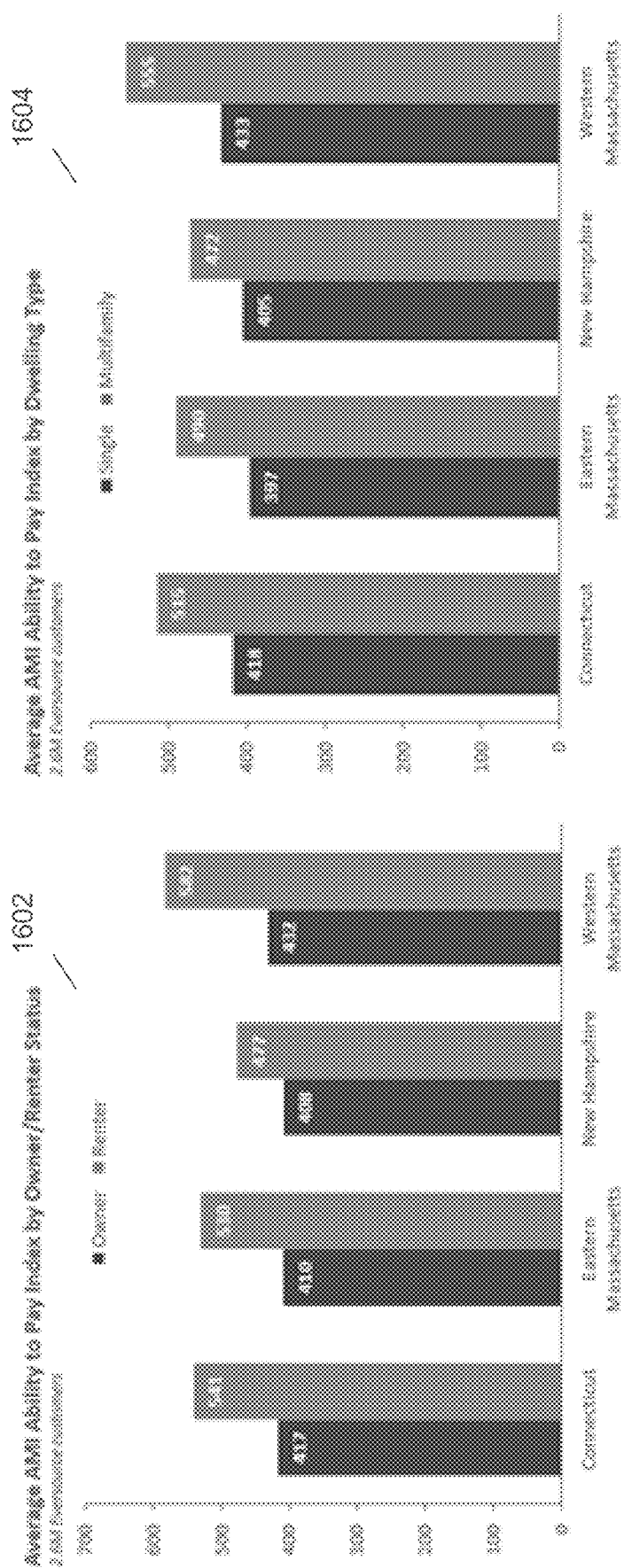
FIG. 16 illustrates sample bar graphs of an income metric based on owner status and dwelling type according to an example embodiment.

In some embodiments, digital characterizations based on the combined data of embodiments illustrate vast differences within low income communities. For example, it was determined that users in Connecticut midsize suburban and fringe towns are on average as vulnerable as small city residents. It was also determined that users in Towns are more likely to have high energy burden than those in Cities and Suburbs. This is even more true of low and moderate income users (and some embodiments do not take into account transportation). It was determined that nearly half of renters have a high energy burden and that Spanish speaking residents were more vulnerable across geographic regions. FIG. 14 illustrates a sample bar graph 1402 of an income metric based on locale according to an example embodiment. FIG. 15 illustrates a sample bar graph 1502 of an income metric based on locale and size according to an example embodiment. FIG. 16 illustrates sample bar graphs 1602 and 1604 of an income metric based on owner status and dwelling type according to an example embodiment.

Figure 17:
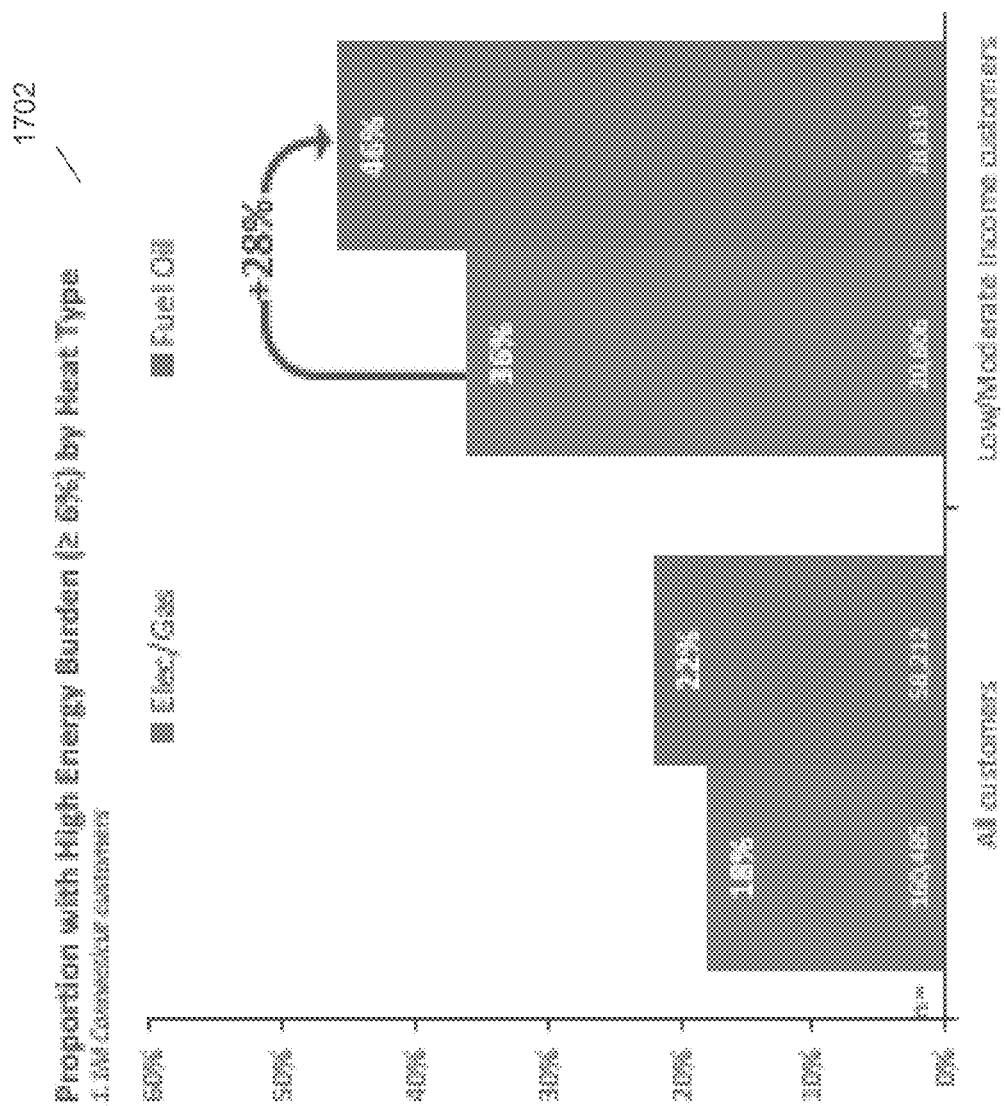
FIG. 17 illustrates a sample bar graph of energy burden based on heat type according to an example embodiment.
Figure 18:
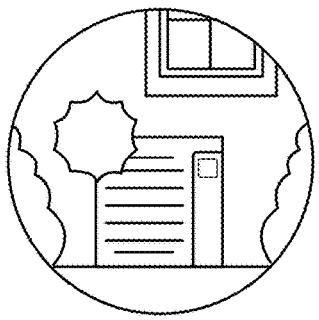
FIG. 18 illustrates a targeted marketing message according to an example embodiment.
Figure 18:
Figure 19:
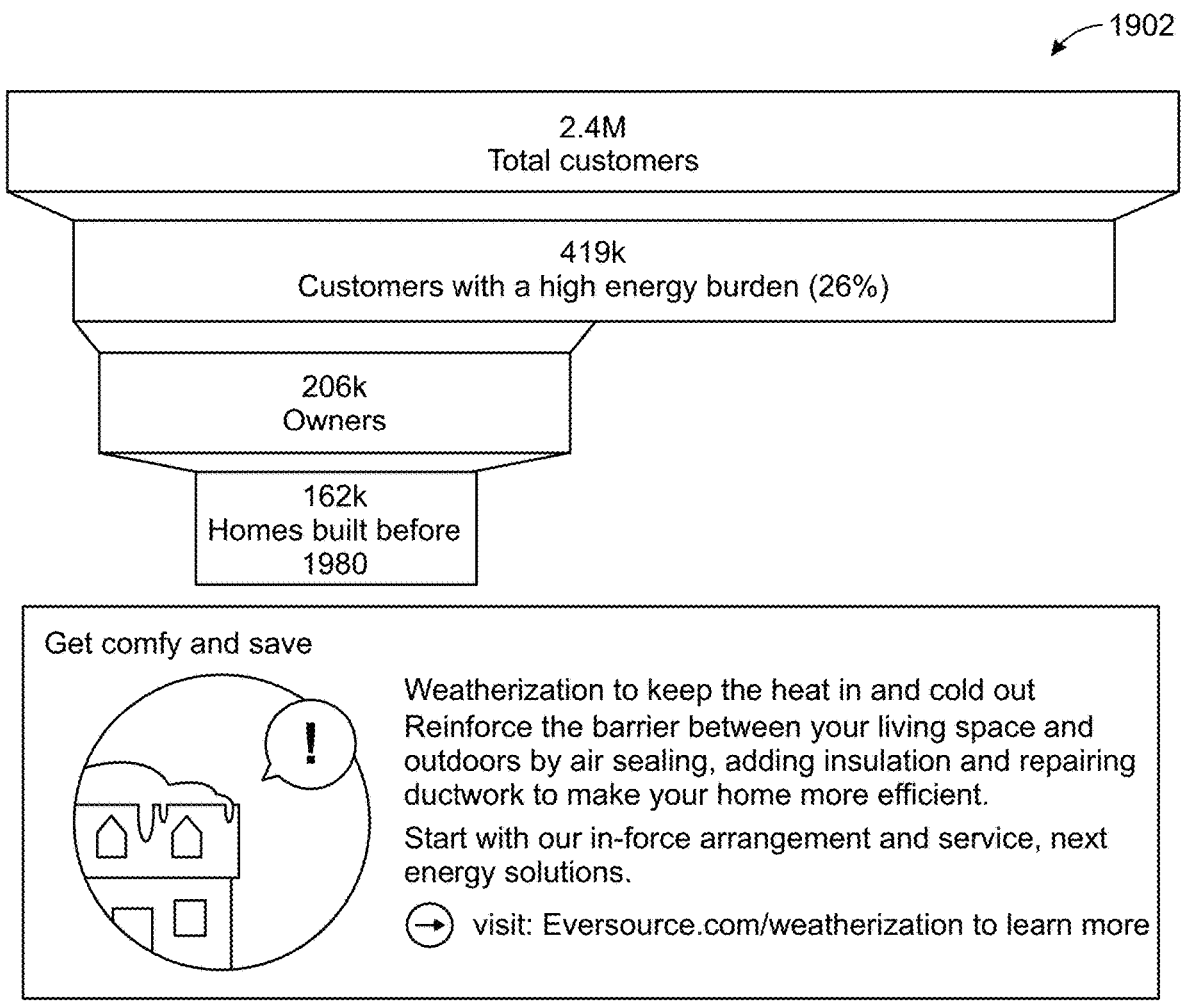
FIG. 19 illustrates a visualization or targeted users according to an example embodiment.

Embodiments that leveraged the combined data also determined that users/households heating with fuel oil are more likely to experience a high energy burden, especially low and moderate income users. This insight reveals a ripe target community for utilities to market programs for heat optimizations programs, such as programs that are available in Massachusetts to decrease the costs of heating. FIG. 17 illustrates a sample bar graph 1702 of energy burden based on heat type according to an example embodiment. In some embodiments, these users can be targeted with a marketing campaign that includes messages relevant to their circumstances. FIG. 18 illustrates a targeted marketing message 1802 according to an example embodiment There is a common misconception that low income users are not interested in taking advantage of the latest technologies. One study of a utility's low-income population showed that, while low-income users were generally less aware of efficiency programs compared to general populations, once they became aware, they were more likely to participate. Millions of users are deferred from weatherization each year, and the segmented and personalized savings messages in some embodiments continue to provide value even for low income users who are not enrolled in weatherization or other suitable programs. Studies have shown that low income users can save as much as traditional users through Home Energy Reports. In fact, reports from Pennsylvania utilities show that low income users consistently save more than the general population, likely because they are more incentivized to make their bills more affordable. See Final annual report to the Pennsylvania Public Utility Commission, 2018. Embodiments of home energy reports are personalized and insights that are determined to be relevant are served to users of interest.

Additionally, surveys have indicated that low income users may like communications such as the Home Energy Report more than those with higher incomes, and thus these reports can be used as an effective customer engagement tool. For example, Home Energy Reports can help low income users learn about energy efficiency program opportunities. In some instances, some utility's low income users are not as aware of energy efficiency programs as their higher income users. However, engagement such as home energy reports have driven a 25% increase in familiarity with energy efficiency programs among low income customers, compared to a 14% increase among households not designated low income, in some cases.

Embodiments targeted marketing campaign also use High Bill Alerts (HBAs) to engage with users and drive improved brand sentiment around energy cost among low income users. Low income users that enabled HBAs showed a 13% increase in a metric used to assess the ability to keep customers informed on ways to lower their energy cost, compared to a 9% increase among households not designated low income.

Embodiments demonstrate the benefits of driving user engagement, such as low-income user engagement, and that these benefits extend beyond direct bill and energy savings. In the case of low-income users, efficiency drives positive outcomes for the system as a whole in three ways:

Low-income efficiency achieves cost-savings for the utility by reducing bad debt, arrearages, and the administrative costs of collection and service termination.

The efficiency and demand savings delivered by low-income programs reduces strain on the grid-and is particularly valuable during summer and winter peaks.

Since low-income rate subsidies are generally funded via tariff riders, high-performing efficiency programs reduce costs for all ratepayers.

Embodiments offer: 1) first of its kind digital targeting and characterization of users down to the census tract level (useful for utility driven programs or for segmentation), 2) Home Energy Reports and 3) High Bill Alerts. Embodiments use this data to target customers based on high energy burden or low ability to pay in different ways in each state. For example, a messaging campaign can be used to target users with high energy burdens to promote Home Performance with ENERGY STAR® and ENERGY STAR® appliances. In another example, a messaging campaign can target moderate income users and renters to promote home weatherization and enhanced incentives.

In some embodiments, targeted users can be prioritized for marketing messages. For example, a sample high priority target and messaging campaign can:

Identify customers with a high energy burden (above the industry-accepted threshold of 6%) and a high Ability to Pay Index, and segment additional profile elements as needed.

Example: Messaging about a low-income eligible heat pump rebate program can be targeted towards highly burdened customers with a high Ability to Pay Index that own their homes and live in suburban areas.

For example, the combined data sets to target these users would be locale (suburban), energy burden (high), ability to pay (high), and fuel type (fuel oil). Upon targeting the users that meet these criteria (e.g., upon receiving the results of an SQL query that filter according to these criteria), a messaging campaign can be implemented that informs and suggests that users purchase a heat pump with a utility sponsored rebate for said heat pump in order to lower their energy bill.

Embodiments include targeting users based on metered energy usage that is measured by metered infrastructure at the user's household, energy usage estimated for a geographic region where the user's household is located (e.g., estimated data), profile information about the user (e.g., socio-economic data), and profile information about the user's household. For example, data about energy usage measured by a meter and data about energy usage estimated based on geographic and socio-economic data can be joined, for example using a geographical mapping, and this joint data can be queried to return targeted results based on the measured data and the geographic and/or socio-economic data (e.g., renting or buying, year house was built, energy infrastructure such as heating type).

In some embodiments, targeting includes establishing energy usage criteria across multiple energy usage data points for a target household and/or user. For example, high energy usage households (or high energy burden households when considering energy usage and ability to pay index, or household income, for the users present in the household) that include both electrical energy usage and some other form of energy usage (e.g., gas, fuel oil) can be targeted. In some embodiments, metering infrastructure may have a gap about the other form of energy usage, and thus data generated by the metering infrastructure can be augmented (joined by other data set(s) to form a joint data set) to detect the other form of energy usage. The targeting can include querying a joint or combined data set to target users and households (e.g., an SQL query with criteria to filter retrieval according to the targeted users/households) across metered energy usage data, energy usage data estimated for a geographic region where the user's household is located, profile information about the user (e.g., socio-economic data), and profile information about the user's household (e.g., renting or buying, year house was built, energy infrastructure such as heating type).

The targeted energy efficiency marketing campaigns implemented by embodiments can be useful for many reasons. First, targeted marketing improves the cost effectiveness of marketing expenditures. In a comparison of a targeted and untargeted campaigns seeking to drive participation in market rate home weatherization programs, the cost of marketing per audit scheduled is lower for the targeted campaign. This both helps use energy efficiency funds more effectively and helps increase participation in programs. Second, relevant offers can increase credibility with users and therefore increase user satisfaction. Third, targeting energy efficiency interventions with users with high energy burdens and low ability to pay can help reduce arrearages by helping users before they get behind on their bills. Doing so would reduce company write offs and enhance profitability, increase energy savings and reduce environmental impacts, and help people in need.

In some embodiments, a targeted marketing campaign can include any combination of channels, such as push notifications to a user's electronic device, messages to home connected devices, email messages to a user, SMS messages to a user's electronic device, traditional mail messages (e.g., letters sent to the household), telephone calls, and the like. In some embodiments, messages, such as electronic messages, can include electronic address information (e.g., Uniform resource locators (URLs)), email addresses, links to web addresses to download native applications, and the like, that provide the user with descriptive information about energy saving techniques or otherwise enable a user to sign up for a program to save energy. In some embodiments, the channels for the targeted marketing campaign can be determined based on known circumstances for the geographic region being targeted (e.g., some regions may respond better to emails versus traditional mails, while others may heavily rely on wireless electronic devices due to lack of access to traditional computing devices, such as laptops).

Figure 20:
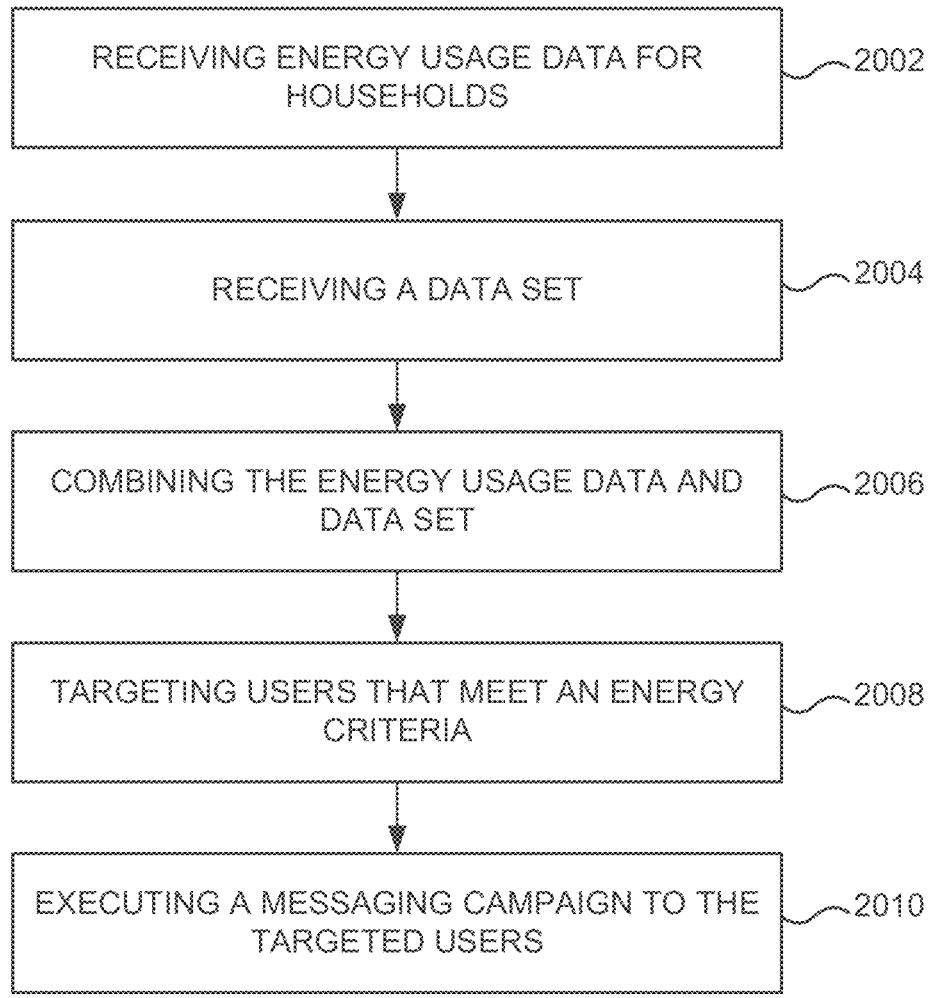
FIG. 20 illustrates a flow diagram for targeting users based on energy usage and profile according to an example embodiment.

FIG. 20 illustrates a flow diagram targeting users based on energy usage and profile according to an example embodiment. In some embodiments, the functionality of FIG. 20 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 20 can be performed by one or more elements of system 200 of FIG. 2.

At 2002, energy usage data can be received for households monitored using a plurality of meters, where the energy usage data is associated with the households and users. For example, meters can be located at households to monitor energy usage at the households. The monitored energy usage for households can be transmitted by the meters to any suitable entity, such as a utility. In some embodiments, the monitored energy usage data includes gaps in energy usage data for the households.

At 2004, a data set can be received that includes estimated energy usage over a plurality of geographic areas. For example, the geographic areas can be a city, county, or census tract. In some embodiments, the estimated energy usage can include an average energy usage estimated for households in the geographic area. In some embodiments, the estimated energy usage can include an average energy usage estimated for households in the geographic area segmented by income. In some embodiments, at least a portion of the received energy usage data monitored using meters is a first type of energy usage and at least a portion of the estimated energy usage over geographic regions is a second type of energy usage. For example, the first type of energy usage can be electrical energy usage and the second type of energy usage can be gas energy usage or fuel energy usage.

At 2006, the monitored energy usage data and the data set can be combined using a mapping, where the mapping includes location mappings between location information for the households and the geographic areas from the data set. For example, the mapping can map a physical location for households to the geographic areas from the data set. In some embodiments, the location mapping and estimated energy usage over the plurality of geographic areas from the data set is used to fill gaps in the monitored energy usage data.

For example, the location information for the households can be a physical location of the households and the location mapping can associate a physical location of the households with the geographic regions from the data set. In some embodiments, at least a portion of the estimated energy usage over the plurality of geographic areas from the data set that fills the gaps in the monitored energy usage data is estimated energy usage of the second type.

At 2008, user with user profiles that meet a targeting criteria can be targeted based on the combined monitored energy usage data and the data set, where the users are targeted based on the location mappings. For example, the targeting criteria can include energy usage criteria across multiple energy usage data points for target household(s) and/or user(s). For example, high energy usage households (or high energy burden households when considering energy usage and ability to pay index, or household income, for the users present in the household) that include both electrical energy usage and some other form of energy usage (e.g., gas, fuel oil) can be targeted. In some embodiments, metering infrastructure may have a gap about the other form of energy usage, and thus data generated by the metering infrastructure can be augmented (joined by other data set(s) to form a joint data set) to detect the other form of energy usage. The targeting can include querying a joint or combined data set to target users and households (e.g., an SQL query with criteria to filter retrieval according to the targeted users/households) across metered energy usage data, energy usage data estimated for a geographic region where the user's household is located, profile information about the user (e.g., socio-economic data), and/or profile information about the user's household (e.g., renting or buying, year house was built, energy infrastructure such as heating type).

In some embodiments, the determination that the user profiles meet the targeting criteria is based on the location mapping between the monitored energy usage and the data set. For example, users with user profiles that meet the targeting criteria can be targeted based on the estimated energy usage of the second type that is used to fill gaps in the received energy usage (measured by meters), where the estimated energy usage of the second type can fill gaps in the received energy usage based on the location mapping that associates the physical location of the households with the geographic regions from the data set.

At 2010, a messaging campaign can be executed by transmitting messages to the targeted users. For example, the messaging campaign can include one or more of transmitting electronic messages to user wireless devices, transmitting physical messages to user households, and transmitting emails to user email addresses.

Embodiments target energy users based on household energy usage and profile. For example, energy usage for households can by monitored, such as by meters at the households. In some instances, the monitored energy usage can be used to target customers. However, many households lack metering infrastructure to capture comprehensive energy usage data. For example, electrical energy usage may be metered, but other forms of energy usage (e.g., gas, other heating types, and the like) may be missing. Accordingly, based on metering infrastructure, the types of energy being used in households, and other factors, the energy usage picture over a geographic region for households can be mixed. Embodiments combine data from disparate sources using a mapping to enable user targeting with this heterogeneous mix for household energy usage.

For example, household metered energy usage data can be combined with known information about the geographic locations of the households. In some embodiments, a mapping that maps households to a geographic location (e.g., city, county, census tract, and the like) can be used to fill gaps in household metered energy usage. For example, where a household has metered electricity energy usage, the geographic location for the household can be mapped to a dataset that associates heating types (e.g., gas, oil, and the like) to geographic location. This mapping can be used to determine whether a gap exists in the metered energy usage data. Further, the mapping of the household's geographic location can also be used to associate an average heating energy usage for a particular heating type to the household, thus filling a gap in the metered data.

Accordingly, a more complete energy usage picture can be generated that enables targeting of users in the households. In some embodiments, profiles can be generated that include features of both households and users within the households. For example, a profile can include users' household income, heating type for geographic location, owner status of the user within the household (e.g., owner or renter), energy usage, energy usage profile based metric (e.g., energy burden, share of income used for energy usage, ability to pay energy usage costs, and the like), and other factors. In this example, a particular user and household combination can be a target profile. For example, households over a certain age that use a particular type of heating may be prone to inefficient heating, and thus an upgrade may result in more energy efficiency and lower costs. In some embodiments, a profile may be targeted for households that use a certain heating type, households over a certain age, with low income users or users with a calculated energy usage profile based metric that meets a criteria (e.g., energy burden over a threshold), and that have energy usage over a criteria (e.g., high energy user).

This profile can be targeted due to the value available to the users associated with the profile, and a marketing campaign can be implemented that messages the users about options for increasing the household energy efficiency. Such a target marketing campaign can result in higher resource efficiency (e.g., cost per energy efficiency achieved) since the messages are targeted to users that are likely to listen and benefit.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A system for targeting users based on energy usage and profile, the system comprising:

a processor and memory storing instructions, wherein, when executing the instructions, the processor is configured to:

receive energy usage data for households monitored using a plurality of meters, the monitored energy usage data for a first portion of the households including a first type of energy usage and a second type of energy usage and the monitored energy usage data for a second portion of the households including the first type of energy usage, wherein the monitored energy usage data is associated with the households and users, and meters for at least some of the second portion of households are configured to monitor the first type of energy usage and are not configured to monitor the second type of energy usage such that monitored energy usage for at least a subset of the second portion of households comprises gaps for the second type of energy usage;

receive a data set that comprises estimated energy usage for households over a plurality of geographic regions, the estimated energy usage for households across at least a portion of the geographic regions including the first type of energy usage and the second type of energy usage, wherein the geographic regions are sized according to one or more of city, county, or census tract;

combine the monitored energy usage data and the data set using a spatial mapping, wherein the spatial mapping comprises location mappings between location information for the households comprising monitored energy usage and the geographic regions from the data set, wherein the monitored energy usage is combined with the data set using the spatial mapping by:

mapping each of the households with monitored energy usage data to one or more of the geographic regions of the data set using the location information for the households and geographic boundaries for the geographic regions; and deriving the second type of energy usage for the subset of the second portion of households based on the estimated second type of energy usage for households across the mapped geographic region from the data set;

target users with user profiles that meet a targeting criteria by querying the combined monitored energy usage data and the data set, wherein at least a portion of users are targeted based on the derived second type of energy usage for the subset of households; and execute a messaging campaign that transmits messages to the targeted users.

2. The system of claim 1, wherein the determination that the user profiles meet the targeting criteria is based on the location mapping between the monitored energy usage and the data set.

3. The system of claim 2, wherein the location information for the households comprises a physical location of the households and the location mapping associates a physical location of the households with the geographic regions from the data set.

4. The system of claim 1, wherein the first type of energy usage Is electrical energy usage and the second type of energy usage is gas energy usage or fuel energy usage.

5. The system of claim 4, wherein users with user profiles that meet the targeting criteria are targeted based on an income that meets an income criteria.

6. The system of claim 1, wherein executing the messaging campaign comprises one or more of transmitting electronic messages to user wireless devices, transmitting physical messages to user households, and transmitting emails to user email addresses.

7. The system of claim 1, wherein each of the households comprises a predetermined fuel type, and the second type of energy usage for the subset of households is derived based on the predetermined fuel type for each of the subset of households.

8. The system of claim 7, wherein the predetermined fuel types comprise electric only, unknown, and one or more of electric plus gas and electric plus fuel.

9. The system of claim 8, wherein, for each of the subset of households that comprise an unknown fuel type:

segmenting the subset of households into a plurality of assigned buckets based on characteristics of the households and characteristics of users associated with the households; and determining a fuel type for each of the subset of households that comprise an unknown fuel type by matching the household characteristics and user characteristics of the assigned bucket to households across the mapped geographic region within the data set, and deriving a fuel type based on one or more known fuel types for the matching households.

10. The system of claim 9, wherein the second type of energy usage for the subset of households that comprise an unknown fuel type is derived based on the estimated second type of energy usage for households across the mapped geographic region that comprise the determined fuel type.

11. The system of claim 1, wherein the energy usage data is received for over a million households.

12. The system of claim 1, wherein the combined monitored energy usage data and the data set are used to calculate a household-level energy burden for the subset of households, and at least a portion of the subset of households are targeted based on the calculated household-level energy burden.

13. A method for generating machine learning predictions for database migrations, the method comprising:

receiving energy usage data for households monitored using a plurality of meters, the monitored energy usage data for a first portion of the households including a first type of energy usage and a second type of energy usage and the monitored energy usage data for a second portion of the households including the first type of energy usage, wherein the monitored energy usage data is associated with the households and users, and meters for at least some of the second portion of households are configured to monitor the first type of energy usage and are not configured to monitor the second type of energy usage such that monitored energy usage for at least a subset of the second portion of households comprises gaps for the second type of energy usage;

receiving a data set that comprises estimated energy usage for households over a plurality of geographic regions, the estimated energy usage for households across at least a portion of the geographic regions including the first type of energy usage and the second type of energy usage, wherein the geographic regions are sized according to one or more of city, county, or census tract;

combining, using a processor, the monitored energy usage data and the data set using a spatial mapping, wherein the spatial mapping comprises location mappings between location information for the households comprising monitored energy usage and the geographic regions from the data set, wherein the monitored energy usage is combined with the data set using the spatial mapping by:

mapping each of the households with monitored energy usage data to one or more of the geographic regions of the data set using the location information for the households and geographic boundaries for the geographic regions; and deriving the second type of energy usage for the subset of the second portion of households based on the estimated second type of energy usage for households across the mapped geographic region from the data set;

targeting, using the processor, users with user profiles that meet a targeting criteria by querying the combined monitored energy usage data and the data set, wherein at least a portion of users are targeted based on the derived second type of energy usage for the subset of households; and executing a messaging campaign that transmits messages to the targeted users.

14. The method of claim 13, wherein the determination that the user profiles meet the targeting criteria is based on the location mapping between the monitored energy usage and the data set.

15. The method of claim 14, wherein the location information for the households comprises a physical location of the households and the location mapping associates a physical location of the households with the geographic regions from the data set.

16. The method of claim 13, wherein the first type of energy usage Is electrical energy usage and the second type of energy usage is gas energy usage or fuel energy usage.

17. The method of claim 13, wherein executing the messaging campaign comprises one or more of transmitting electronic messages to user wireless devices, transmitting physical messages to user households, and transmitting emails to user email addresses.

18. A non-transitory computer readable medium having instructions stored thereon that, when executed by a processor, cause the processor to target users based on energy usage and profile, wherein, when executed, the instructions cause the processor to:

receive energy usage data for households monitored using a plurality of meters, the monitored energy usage data for a first portion of the households including a first type of energy usage and a second type of energy usage and the monitored energy usage data for a second portion of the households including the first type of energy usage, wherein the monitored energy usage data is associated with the households and users, and meters for at least some of the second portion of households are configured to monitor the first type of energy usage and are not configured to monitor the second type of energy usage such that monitored energy usage for at least a subset of the second portion of households comprises gaps for the second type of energy usage;

receive a data set that comprises estimated energy usage for households over a plurality of geographic regions, the estimated energy usage for households across at least a portion of the geographic regions including the first type of energy usage and the second type of energy usage, wherein the geographic regions are sized according to one or more of city, county, or census tract;

combine the monitored energy usage data and the data set using a spatial mapping, wherein the spatial mapping comprises location mappings between location information for the households comprising monitored energy usage and the geographic regions from the data set, wherein the monitored energy usage is combined with the data set using the spatial mapping by:

mapping each of the households with monitored energy usage data to one or more of the geographic regions of the data set using the location information for the households and geographic boundaries for the geographic regions; and deriving the second type of energy usage for the subset of the second portion of households based on the estimated second type of energy usage for households across the mapped geographic region from the data set;

target users with user profiles that meet a targeting criteria by querying the combined monitored energy usage data and the data set, wherein at least a portion of users are targeted based on the derived second type of energy usage for the subset of households; and execute a messaging campaign that transmits messages to the targeted users.

* * * * *

UNITED STATES PATENT AND TRADEMARK OFFICE
CERTIFICATE OF CORRECTION

PATENT NO. : 11,270,345 B2
APPLICATION NO. : 16/806524
DATED : March 8, 2022
INVENTOR(S) : Lin et al.

It is certified that error appears in the above-identified patent and that said Letters Patent is hereby corrected as shown below:

On the Title Page

On page 2, Column 2, under Other Publications, Line 19, delete "General/pu blications" and insert -- General/publications --, therefor.

In the Specification

In Column 1, Line 50, delete "executed" and insert -- executed. --, therefor.

In Column 2, Line 48, delete "by" and insert -- be --, therefor.

In Column 5, Line 53, delete "("HFDS")," and insert -- ("HDFS"), --, therefor.

In Column 9, Lines 22-24, delete "c. Fuel usage charges: County-level annual fuel charges for electric, natural gas, and fuel oil, segmented by income level and owner/renter status" and insert the same on Column 9, Line 23 as a new paragraph, therefor.

In Column 9, Line 30, delete "$1,000" and insert the same on Column 9, Line 29 as a continuation of the same paragraph, therefor.

In Column 11, Line 11, delete "Statistics'" and insert -- Statistics --, therefor.

In Column 13, Line 12, delete "embodiment" and insert -- embodiment. --, therefor.

In Column 17, Line 3, delete "by" and insert -- be --, therefor.

Signed and Sealed this
Second Day of August, 2022

Katherine Kelly Vidal
*Director of the United States Patent and Trademark Office*

CERTIFICATE OF CORRECTION (continued)
U.S. Pat. No. 11,270,345 B2

In the Claims

In Column 19, Line 15, in Claim 4, delete "Is" and insert -- is --, therefor.

In Column 20, Line 52, in Claim 16, delete "Is" and insert -- is --, therefor.